(12) United States Patent
Kehoe

(10) Patent No.: US 10,424,164 B2
(45) Date of Patent: Sep. 24, 2019

(54) SYSTEM FOR MANAGING INDIVIDUAL PERFORMANCE CHALLENGES IN FANTASY GAMING

(71) Applicant: ZCO ACQUISITIONS, INC., Minneapolis, MN (US)

(72) Inventor: Daniel G. Kehoe, Atlanta, GA (US)

(73) Assignee: ZCO Acquisitions, Inc., Minneapolis, MN (US)

(*) Notice: Subject to any disclaimer, the term of this patent is extended or adjusted under 35 U.S.C. 154(b) by 232 days.

(21) Appl. No.: 14/975,642

(22) Filed: Dec. 18, 2015

(65) Prior Publication Data

US 2016/0104352 A1 Apr. 14, 2016

Related U.S. Application Data

(63) Continuation-in-part of application No. 14/927,445, filed on Oct. 29, 2015, which is a continuation of
(Continued)

(51) Int. Cl.
*G07F 17/32* (2006.01)
*A63F 13/795* (2014.01)
(Continued)

(52) U.S. Cl.
CPC ........ *G07F 17/3288* (2013.01); *A63F 13/795* (2014.09); *A63F 13/828* (2014.09);
(Continued)

(58) Field of Classification Search
None
See application file for complete search history.

(56) References Cited

U.S. PATENT DOCUMENTS

| | | |
|---|---|---|
| 4,501,425 A | 2/1985 | Alvarado |
| 5,846,132 A | 12/1998 | Junkin |
| 5,860,862 A | 1/1999 | Junkin |
| 6,183,366 B1 | 2/2001 | Goldberg et al. |
| 7,762,878 B2 | 7/2010 | Nicholas |
| 7,988,560 B1 | 8/2011 | Heller |

(Continued)

FOREIGN PATENT DOCUMENTS

| | | |
|---|---|---|
| CN | 101919274 A | 12/2010 |
| JP | 200285851 A | 3/2002 |

(Continued)

OTHER PUBLICATIONS

The International Search Report and Written Opinion rendered by the International Searching Authority for PCT/US15/66930, dated Mar. 28, 2016, 13 pages.

*Primary Examiner* — Jason T Yen
(74) *Attorney, Agent, or Firm* — Skaar Ulbrich Macari, P.A.

(57) ABSTRACT

Short term wagers can be made on predicted outcomes of performances in events such as the performance of a specific player in a sports event or the performance of a company stock in a given time frame. A user can select a plurality of challenge parameters, including a time duration of a challenge; a subject matter of the challenge; a type of wager for the challenge; a specific player for the challenge; and a wager amount for the challenge. The plurality of challenge parameters can be transmitted to a matching engine in order to match the challenge to one or more target users based upon a comparison of the challenge parameters to a plurality of historical challenge parameters for each of the target users to find common parameters. A casino or sports bookmaker can also accept the challenge as a house player.

17 Claims, 21 Drawing Sheets

Related U.S. Application Data application No. PCT/US2014/036241, filed on Apr. 30, 2014.

(60) Provisional application No. 62/094,674, filed on Dec. 19, 2014, provisional application No. 61/936,501, filed on Feb. 6, 2014, provisional application No. 61/818,028, filed on May 1, 2013.

(51) Int. Cl.
*A63F 13/828* (2014.01)
*H04L 29/08* (2006.01)
*H04L 29/06* (2006.01)

(52) U.S. Cl.
CPC ...... *G07F 17/3204* (2013.01); *G07F 17/3237* (2013.01); *G07F 17/3244* (2013.01); *G07F 17/3269* (2013.01); *G07F 17/3276* (2013.01); *H04L 67/125* (2013.01); *H04L 67/22* (2013.01); *H04L 67/306* (2013.01); *H04L 67/38* (2013.01); *H04L 69/24* (2013.01)

(56) References Cited

U.S. PATENT DOCUMENTS

| | | | |
|---|---|---|---|
| 8,029,289 B2 | 10/2011 | Neel | |
| 8,099,182 B1 | 1/2012 | Kasten | |
| 8,105,159 B2 | 1/2012 | Wojewoda | |
| 8,167,712 B2 | 5/2012 | Sarkar | |
| 8,176,518 B1 | 5/2012 | Junkin | |
| 8,202,149 B2 | 6/2012 | Gedling | |
| 8,206,214 B2 | 6/2012 | Wojewoda | |
| 8,210,918 B2 | 7/2012 | Nicholas | |
| 8,246,433 B2 | 8/2012 | Lore | |
| 8,292,725 B2 | 10/2012 | Wikander | |
| 8,315,722 B1 | 11/2012 | Russo | |
| 8,337,310 B1 | 12/2012 | Bjordahl | |
| 8,340,794 B1 | 12/2012 | Trdinich | |
| 8,371,916 B2 | 2/2013 | Nicholas | |
| 8,403,756 B2 | 3/2013 | Baray | |
| 8,447,420 B2 | 5/2013 | Bloodworth | |
| 8,460,078 B2 | 6/2013 | Moore | |
| 8,465,369 B2 | 6/2013 | Dokei | |
| 8,475,249 B2 | 7/2013 | Belmarch | |
| 8,509,929 B1 | 8/2013 | Hughes | |
| 8,512,148 B2 | 8/2013 | Butz, Jr. | |
| 8,538,563 B1* | 9/2013 | Barber | G07F 17/3276 463/28 |
| 8,548,611 B2 | 10/2013 | Ahlstrom | |
| 8,568,236 B2 | 10/2013 | Baray | |
| 8,572,498 B2 | 10/2013 | Braun | |
| 8,814,660 B2 | 8/2014 | Thompson | |
| 9,868,056 B2 | 1/2018 | Kehoe et al. | |
| 2002/0115488 A1 | 8/2002 | Berry et al. | |
| 2002/0142842 A1 | 10/2002 | Easley et al. | |
| 2004/0110552 A1 | 6/2004 | Del Prado | |
| 2004/0235542 A1 | 11/2004 | Stronach et al. | |
| 2004/0266530 A1 | 12/2004 | Bishop | |
| 2005/0261043 A1 | 11/2005 | Slade | |
| 2006/0252476 A1 | 11/2006 | Bahou | |
| 2006/0258421 A1 | 11/2006 | Nicholas et al. | |
| 2007/0021241 A1* | 1/2007 | Geller | A63B 63/004 473/415 |
| 2007/0185599 A1 | 8/2007 | Robinson et al. | |
| 2007/0233585 A1 | 10/2007 | Simon et al. | |
| 2007/0265092 A1 | 11/2007 | Betteridge | |
| 2008/0064488 A1* | 3/2008 | Oh | G07F 17/32 463/25 |
| 2008/0102911 A1 | 5/2008 | Campbell | |
| 2008/0113782 A2 | 5/2008 | Moshal | |
| 2008/0125228 A1 | 5/2008 | Ware | |
| 2008/0153589 A1 | 6/2008 | Baray | |
| 2008/0161113 A1 | 7/2008 | Hansen | |
| 2008/0207326 A1* | 8/2008 | Carlevato | A63F 13/10 463/40 |
| 2009/0005172 A1* | 1/2009 | Shibahara | A63F 13/12 463/42 |
| 2009/0045581 A1 | 2/2009 | Cornelio | |
| 2009/0270155 A1 | 10/2009 | Glass | |
| 2010/0184495 A1 | 7/2010 | Levy et al. | |
| 2010/0211431 A1 | 8/2010 | Lutnick et al. | |
| 2010/0252998 A1 | 10/2010 | Guidroz | |
| 2010/0279754 A1 | 11/2010 | Tanenbaum | |
| 2010/0311484 A1 | 12/2010 | Suh et al. | |
| 2011/0028195 A1 | 2/2011 | Pennington et al. | |
| 2011/0053681 A1 | 3/2011 | Goldman et al. | |
| 2011/0237317 A1 | 9/2011 | Noonan | |
| 2011/0256911 A1 | 10/2011 | Heller et al. | |
| 2011/0306427 A1 | 12/2011 | Pawson | |
| 2011/0319171 A1 | 12/2011 | Ngozika | |
| 2012/0009984 A1 | 1/2012 | Amaitis et al. | |
| 2012/0115554 A1 | 5/2012 | Cairns et al. | |
| 2012/0115585 A1 | 5/2012 | Goldman et al. | |
| 2012/0129610 A1 | 5/2012 | Mazursky et al. | |
| 2012/0142411 A1* | 6/2012 | Thompson | G07F 17/326 463/25 |
| 2012/0149472 A1 | 6/2012 | Miller | |
| 2012/0149473 A1 | 6/2012 | Moore et al. | |
| 2012/0172112 A1 | 7/2012 | Sklanka et al. | |
| 2012/0202599 A1 | 8/2012 | Cohen | |
| 2012/0220375 A1 | 8/2012 | Williams | |
| 2012/0231890 A1 | 9/2012 | Junkin | |
| 2012/0289340 A1 | 11/2012 | Pawson | |
| 2012/0316659 A1 | 12/2012 | Magas | |
| 2012/0330444 A1 | 12/2012 | Sloan | |
| 2013/0017874 A1 | 1/2013 | Trdinich | |
| 2013/0046639 A1* | 2/2013 | Woodard | G06Q 30/08 705/14.67 |
| 2013/0053147 A1 | 2/2013 | Miller | |
| 2013/0053989 A1 | 2/2013 | Miller | |
| 2013/0072307 A1 | 3/2013 | Heller | |
| 2013/0079130 A1 | 3/2013 | Takacs | |
| 2013/0245797 A1 | 9/2013 | Moore | |
| 2013/0260847 A1 | 10/2013 | Amaitis et al. | |
| 2013/0260898 A1 | 10/2013 | Pepe | |
| 2013/0267313 A1 | 10/2013 | Belmarch | |
| 2013/0344964 A1 | 12/2013 | Sloan et al. | |
| 2014/0045595 A1 | 2/2014 | Baschnagel | |
| 2014/0121013 A1 | 5/2014 | Carson et al. | |
| 2014/0162771 A1 | 6/2014 | Kurdimov | |
| 2014/0228119 A1 | 8/2014 | Koenig | |
| 2014/0274245 A1 | 9/2014 | Stickel | |
| 2014/0274321 A1* | 9/2014 | Ulrich | G07F 17/3244 463/25 |
| 2014/0287831 A1 | 9/2014 | Relyea et al. | |
| 2014/0309023 A1 | 10/2014 | Suyat et al. | |
| 2014/0329584 A1 | 11/2014 | Thompson | |
| 2015/0273345 A1 | 10/2015 | Ford | |
| 2016/0035187 A1* | 2/2016 | Swanson | G07F 17/3244 463/25 |
| 2016/0045825 A1 | 2/2016 | Kehoe et al. | |
| 2016/0086440 A1 | 3/2016 | Kehoe et al. | |
| 2016/0101353 A1 | 4/2016 | Kehoe | |
| 2018/0015374 A1 | 1/2018 | Kehoe | |
| 2018/0126285 A1 | 5/2018 | Kehoe | |

FOREIGN PATENT DOCUMENTS

| | | |
|---|---|---|
| JP | 2002352011 A | 12/2002 |
| JP | 2007334919 A | 12/2007 |
| JP | 2008113782 A | 5/2008 |
| JP | 2008288789 A | 11/2008 |
| JP | 2010099294 A | 5/2010 |
| JP | 2011227784 A | 11/2011 |
| WO | 2002078806 A1 | 10/2002 |
| WO | 2012125131 A1 | 9/2012 |
| WO | 2012154347 A1 | 11/2012 |
| WO | 2014179493 A1 | 11/2014 |

* cited by examiner

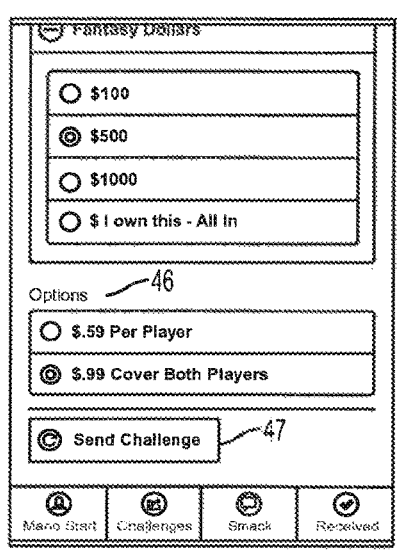
FIG. 11
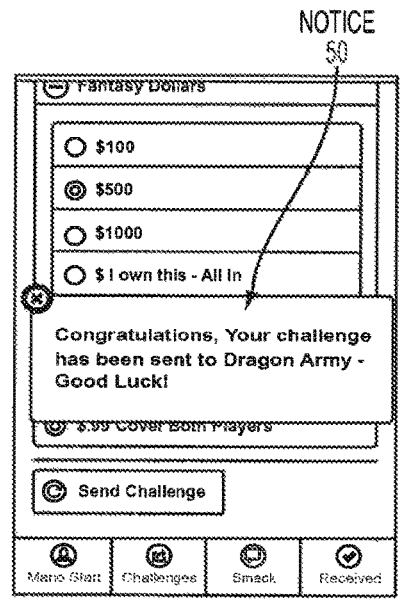
FIG. 12
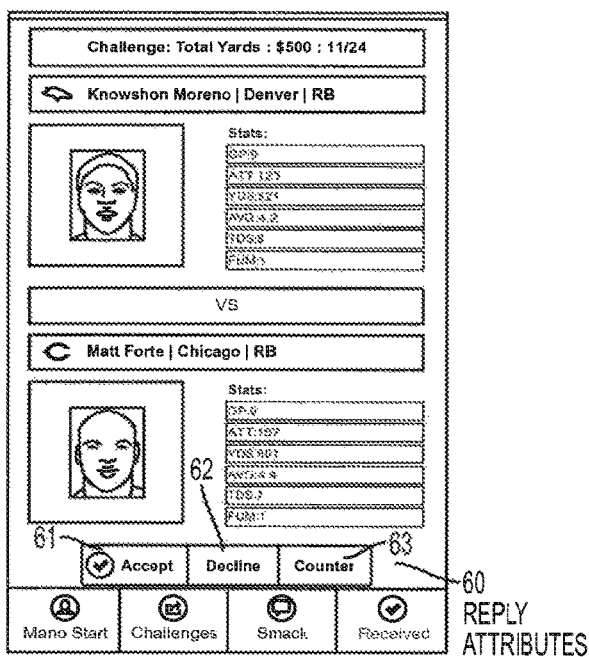
FIG. 13
FIG. 14

FIG. 21

| | | BET NOT BUY | | |
|---|---|---|---|---|
| MY BETS | | | PLAYER POINTS 10000 | |
| GE (GE.N) | 10/5 11:32AM | BET $100 | OUTCOME PENDING | |
| APPLE (AAPL.O) | 10/5 11:41AM | BET $100 | OUTCOME LOST | |
| AMAZON (AMZN.O) | 10/5 11:45AM | BET $50 | OUTCOME WON | |
| GOOGLE (GOOG.O) | 10/5 11:44AM | BET $100 | OUTCOME LOST | |
| FACEBOOK (FB.O) | 10/5 11:47AM | BET $20 | OUTCOME LOST | |
| COKE (COKE.O) | 10/5 11:51AM | BET $50 | OUTCOME WON | |
| SONY (SNE.O) | 10/5 11:55AM | BET $50 | OUTCOME WON | |
| PEPSI (PEP.O) | 10/5 11:57AM | BET $20 | OUTCOME LOST | |

MY BETS  TRENDS  WATCH  INFO  SEARCH

BET NOT BUY

Fig. 29

| AVAILABLE PLAYERS BY POSITION | | | | | | | | | | | | |
|---|---|---|---|---|---|---|---|---|---|---|---|---|
| QB | RB | WR | TE | K | D/ST | | | | | | | |

QUARTERBACK

SEARCH:
[                              ]

| ⇌ ADD & PLAYER | ⊛ TEAM | GAMES | TD | 2P | XP | FG | PAYD | RUYD | REYD | AVG. PTS | FP |
|---|---|---|---|---|---|---|---|---|---|---|---|
| ⊕ JIMMY GAROPPOLO | PATRIOTS | 4 | 5 | 0 | 0 | 0 | 618 | 10 | 0 | 139.5 | 55.7 |
| ⊕ RYAN NASSIB | GIANTS | 5 | 5 | 0 | 0 | 0 | 596 | 0 | 0 | 10.8 | 53.8 |
| ⊕ MATTHEW MCGLOIN | RAIDERS | 4 | 5 | 0 | 0 | 0 | 472 | 13 | 0 | 12.5 | 50.2 |
| ⊕ AUSTIN DAVIS | RAMS | 4 | 4 | 0 | 0 | 0 | 534 | 19 | 0 | 11.8 | 47.3 |
| ⊕ MATT BARKLEY | EAGLES | 4 | 4 | 0 | 0 | 0 | 500 | 11 | 0 | 11.3 | 45.1 |
| ⊕ COLT MCCOY | REDSKINS | 3 | 4 | 0 | 0 | 0 | 496 | 10 | 0 | 14.9 | 44.8 |
| ⊕ TYROD TAYLOR | RAVENS | 4 | 3 | 0 | 0 | 0 | 345 | 125 | 0 | 11.1 | 44.3 |

Fig. 30

SYSTEM FOR MANAGING INDIVIDUAL PERFORMANCE CHALLENGES IN FANTASY GAMING

PRIORITY

The present application claims the priority benefit of U.S. Provisional Application 62/094,674, filed Dec. 19, 2014.

The present application is also a continuation-in-part of, and claims priority benefit of, U.S. patent application Ser. No. 14/927,445, filed Oct. 29, 2015, which is a continuation of PCT/US2014/036241, filed Apr. 30, 2014, which claims the priority benefit of (1) U.S. Provisional Application 61/936,501, filed Feb. 6, 2014, and (2) U.S. Provisional Application 61/818,028, filed May 1, 2013.

All of the foregoing applications are hereby incorporated herein by reference in their entireties.

FIELD

Certain disclosed embodiments relate to the field of fantasy sports systems and methods.

BACKGROUND

Currently available fantasy games and game-like applications, including fantasy sports systems, monitor and record individual player performance as part of scoring the competitions. Because results and scores are driven, in part, by individual player performance, many users follow individual players very closely. Many users strongly desire a way to more actively use and apply their knowledge of individual players, in contests with other users, within the context of games such as fantasy sports. Thus, there is a need in the art for improved game systems and contest applications that allow users to compete with others in contests that are based, at least in part, on individual player performance.

SUMMARY

Interactive systems and methods for creating game and game-like applications, including an individual challenge application for building a head-to-head and group challenges between users and or a "house" user, are presented. A system for building and managing a plurality of direct challenges includes an application services interface, a plurality of user interfaces, a challenge application, and a plurality of external data services for tracking the progress and player performance during real-world events, such as sporting events.

In some embodiments, a system for managing a plurality of direct challenges between users of a game application, and optionally a "house" user, includes: an application services interface comprising a database and an external data reader in communication with a plurality of external data services; a plurality of user interfaces to facilitate access to the application services interface; and a challenge application comprising a non-transitory computer-readable medium containing program instructions for managing a plurality of direct challenges between users, and one or more processors of a computer system coupled to the non-transitory computer-readable medium for executing the program instructions, including: (a) receive a first competitor selected by the first user for participation in a first direct challenge; (b) receive a second competitor to serve as a rival of the first competitor in the first direct challenge; (c) receive a performance parameter for the first direct challenge; (d) receive a time period for the first direct challenge; (e) receive an acceptance from a second user and, in response, deploy the first direct challenge; (f) instruct the external data reader to collect a first set of actual performance data for the first competitor during the time period, and a second set of actual performance data for the second competitor during the time period, from at least one of the plurality of external data services; (g) calculate a score for the first direct challenge, wherein the score is based on a comparison of the first set of actual performance data and the second set of actual performance data; (h) report the score to the first user; (i) store the score in the database (j) facilitate and reconcile wagers.

The one or more processors may further execute the program instructions to: present the first direct challenge to the second user on a display; provide the second user with an option to submit a response consisting of an indicator selected from the group consisting of accept, decline, and counteroffer; receive the response from the second user; and in response to receiving the response equal to counteroffer, present one or more attributes of the first direct challenge to the second user for review and modification.

The first competitor may comprise a first team, and the second competitor may comprise a second team.

The first competitor may comprise a first group of two or more, and the second competitor may comprise a second group of two or more, wherein the second group has the same number of participants as the first group.

The one or more processors may further execute the program instructions to: receive a selection of a first monetary or non-monetary wager related to the first direct challenge; and apply the wager to the first direct challenge based on the score.

The application services interface may further comprise a challenge reporting tool for displaying a plurality of direct challenges to one or more of the fellow users. The challenges can be arranged by date/time or other logical order.

The application services interface may further comprise a social reporting engine for collecting and storing user data in a user database, the user data comprising demographic facts and game-play behavior, for at least a first subset of the fellow users during a predetermined subset of interactions with the application services interface.

In other embodiments, an interactive system for a plurality of game-like activities includes: (a) a content management system comprising a plurality of game templates, a game content database in communication with a plurality of external data services; (b) a plurality of application services, in communication with the content management system, comprising one or more game-like applications; and (c) one or more user interfaces to facilitate access to the plurality of application services for a plurality of users, wherein the one or more game-like applications comprises a challenge application.

The interactive system may further include a social reporting engine, in communication with the content management system, for collecting and storing user data in a user database, the user data comprising demographic facts and game-play behavior, for at least a first subset of the plurality of users during a predetermined subset of interactions with the plurality of application services.

The disclosure includes a user fantasy challenge gaming system. The gaming system includes a gaming engine and a user computing device coupled to the gaming engine. The user computing device includes a graphical user interface, memory and a processor to execute a software application stored in the memory, the software code enabling the user to create a plurality of parameters of a challenge. The parameters include: a time duration of a challenge; a subject matter of the challenge; a type of wager for the challenge; a specific player for the challenge; and a wager amount for the challenge. The plurality of parameters of the challenge are transmitted to the gaming engine.

The gaming engine can include a matching engine to match the challenge to one or more second or target user's that are like to accept the challenge given similarities between the challenge parameters and the historical challenge parameters of the target users. A house player, such as a casino or sports bookmaker, can also directly accept the challenge.

The disclosure also includes a method of wagering on predicted outcomes of performances in events. The method includes launching a challenge application on a computing device by a user. The user selects a plurality of challenge parameters, including a time duration of a challenge; a subject matter of the challenge a type of wager for the challenge; a specific player for the challenge; and a wager amount for the challenge.

The plurality of challenge parameters can be transmitted to a matching engine. The matching engine matches the challenge to one or more target users based upon a comparison of the challenge parameters to a plurality of historical challenge parameters for each of the target users to find a match between at least one of the challenge parameters and the historical challenge parameters. The challenge is then transmitted to the one or more target users.

The disclosure further includes a method of matching a wager on predicted outcomes of performances in events with a target user that is likely to accept the wager. A first user on a computing device selects a plurality of challenge parameters, including a time duration of a challenge; a subject matter of the challenge; a type of wager for the challenge; a specific player for the challenge; and a wager amount for the challenge. The challenge parameters are compared to a plurality of historical challenge parameters for each of a plurality of second users to find a match between at least one of the challenge parameters and the historical challenge parameters. The challenge is then transmitted to the one or more target users where there was a match between the at least one challenge parameters of the first user and the historical challenge parameters of the second user.

The above summary is not intended to limit the scope of the invention, or describe each embodiment, aspect, implementation, feature or advantage of the invention. The detailed technology and preferred embodiments for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

BRIEF DESCRIPTION OF THE DRAWINGS

Features of the various embodiments disclosed will become more apparent in the detailed description, in which reference is made to the appended drawing, wherein:

FIGS. 3 through 13 are a series of sample displays, with interactive user interfaces, for a system for building and managing direct challenges, according to various embodiments.

FIG. 14 is a sample display of a list of direct challenges, according to various embodiments.

FIGS. 19 through 23 illustrate various different types of game play subjects, according to various embodiments.

FIGS. 24 through 29 are a series of sample user displays, with interactive user interfaces, for a system for building and managing direct challenges, according to various embodiments.

FIG. 30 illustrates a user interface for researching players before performing a challenge or a swap, according to various embodiments.

DETAILED DESCRIPTION

Figure 1:
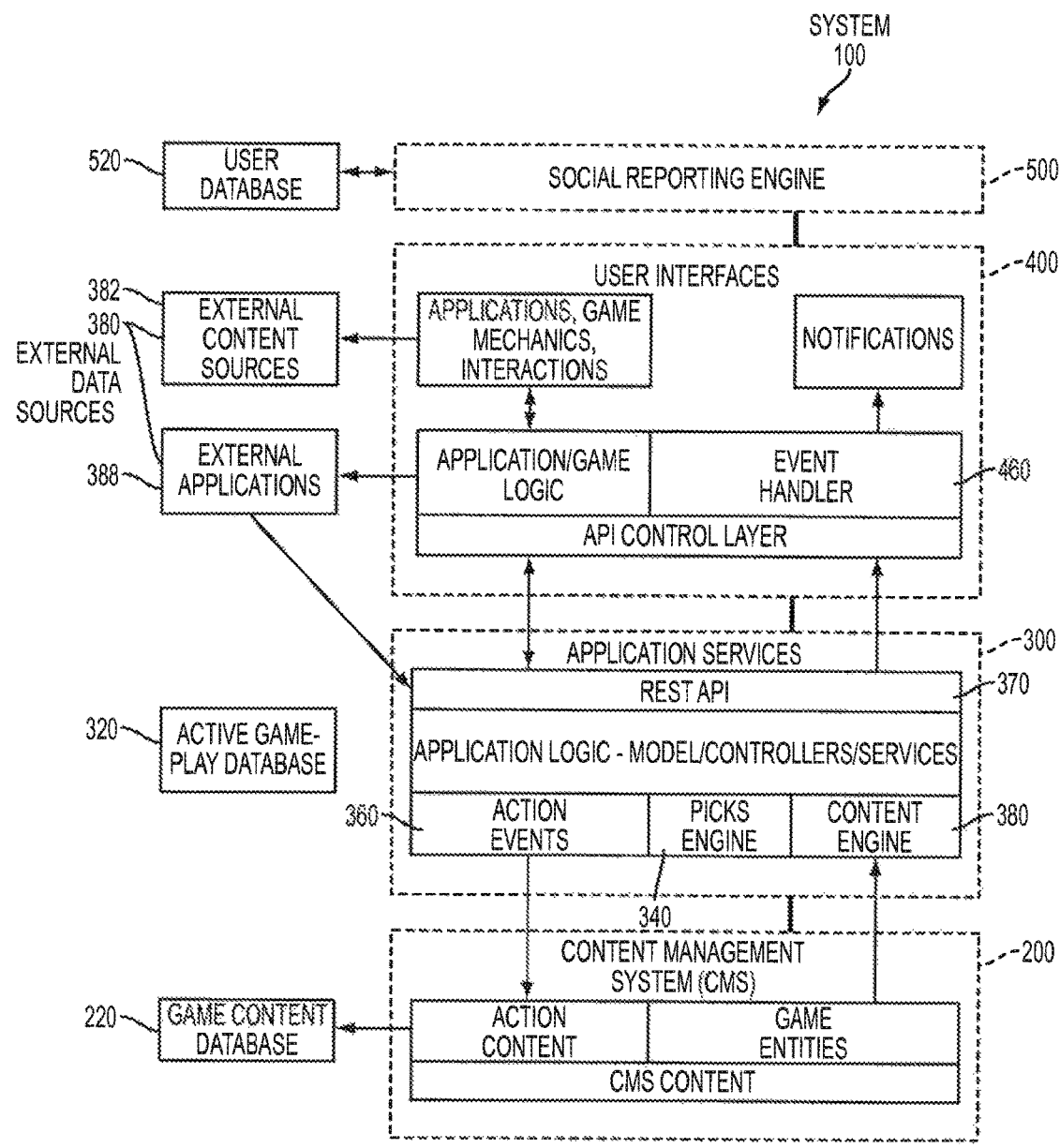
FIG. 1 is a schematic illustration of a system for game creation and management, shown in one exemplary platform architecture, according to various embodiments.

In the following descriptions, the present invention will be explained with reference to various exemplary embodiments. Nevertheless, these embodiments are not intended to limit the present invention to any specific example, environment, application, or particular implementation described herein. Therefore, descriptions of these example embodiments are only provided for purpose of illustration rather than to limit the present invention.

The present systems and apparatuses and methods are understood more readily by reference to the following detailed description, examples, drawings, and claims, and their previous and following description. However, before the present devices, systems, and/or methods are disclosed and described, it is to be understood that this invention is not limited to the specific devices, systems, and/or methods disclosed unless otherwise specified, as such can, of course, vary. It is also to be understood that the terminology used herein is for the purpose of describing particular aspects only and is not intended to be limiting.

Like parts are marked throughout the following description and drawings with the same reference numerals. The drawings may not be to scale and certain features may be shown exaggerated in scale or in somewhat schematic format in the interest of clarity, conciseness, and to convey information.

The following description of the invention is provided as an enabling teaching of the invention in its best, currently known embodiment. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used throughout, the singular forms "a," "an" and "the" include plural referents unless the context clearly dictates otherwise. Thus, for example, reference to a component can include two or more such components unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

Games

As used herein, the term games refers to activities undertaken for play or amusement, as well as game-like interactive activities that are used to facilitate the pursuit of a specific object or purpose. In a broad sense, the games described herein enable users to interact with both the game content itself and with game-related insertions or requests (sometimes referred as calls to action). As described, the games and game-like interactive systems herein, including the game systems for creating supersets of games, provide deeper engagement between the user and the game. As used herein, user engagement refers to the frequency of play, duration of play, and the depth of interaction with game content and/or calls to action. Deeper user engagement increases the value of games, especially in the commercial context. Games created and managed by the game system described herein are lower in cost, faster to deploy, and easier to manage than those produced by existing game systems.

Fantasy Games.

Fantasy games are competitions in which each user selects and manages an imaginary or fantasy player, team or groups of "players." The players can be real players of a particular sport, or non-human participants such as stocks, events, animals and television characters, etc. Each user accumulates points according to the real-world performance of each player. Typically, the user assumes the role of team manager or coach, choosing players in a draft process, trading players, establishing active rosters and inactive (bench) rosters, changing rosters, and the like, in accordance with each particular league's set of rules and regulations. Alternatively, the user can be the fantasy "owner" of a single player or group of players.

Non-Sports Games.

Figure 19:
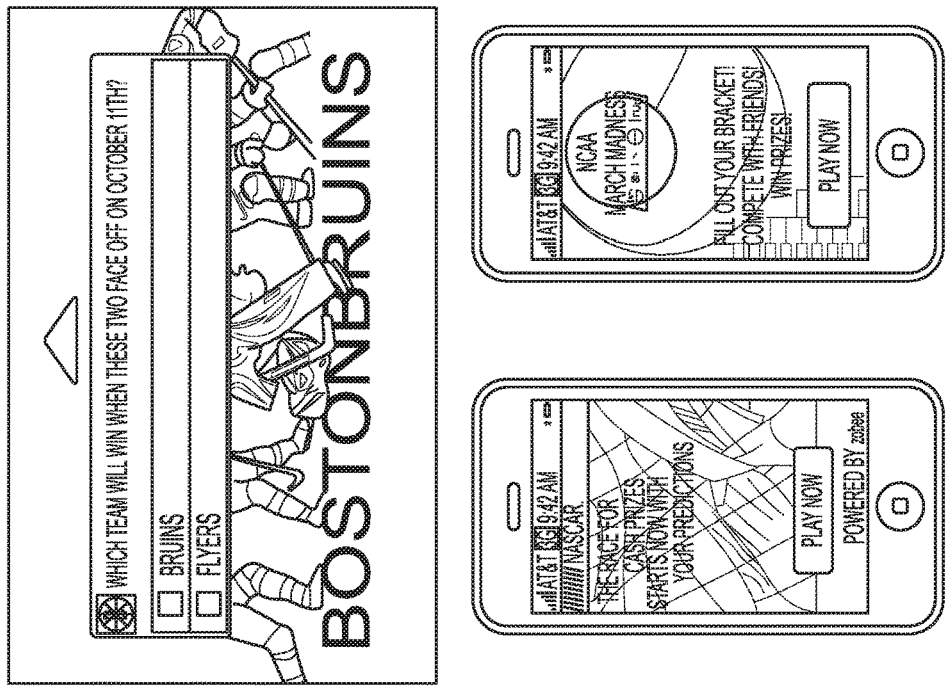
Figure 19:
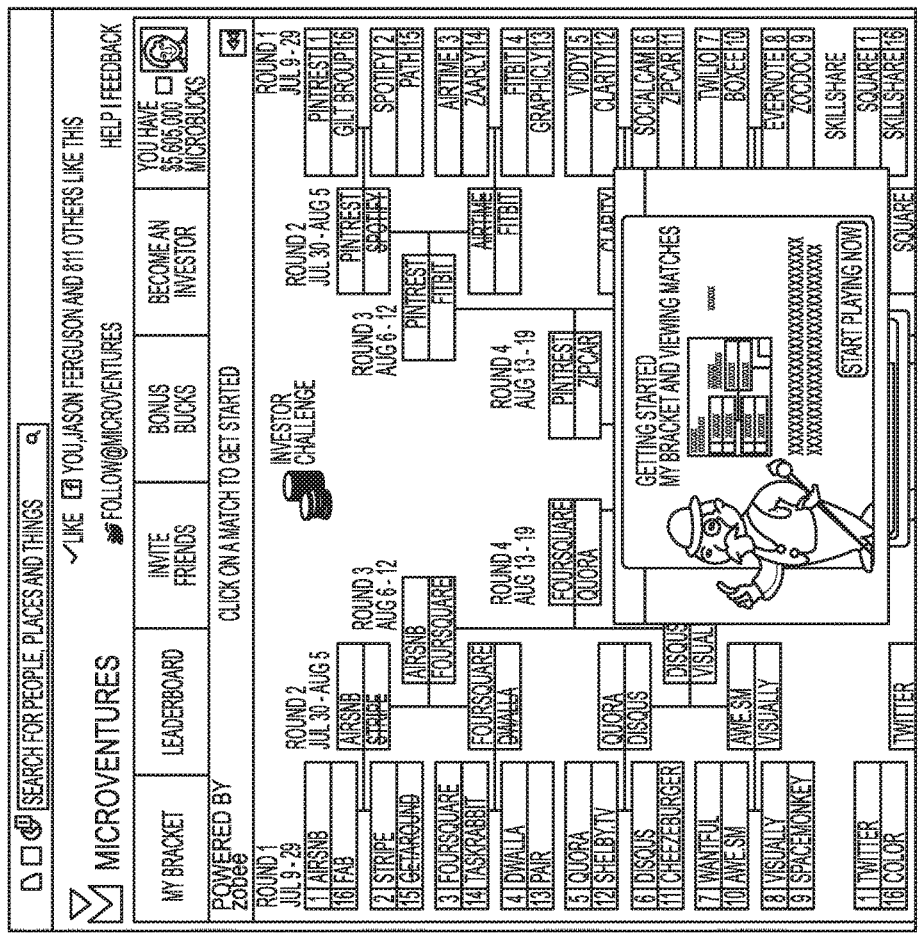
Figure 20:
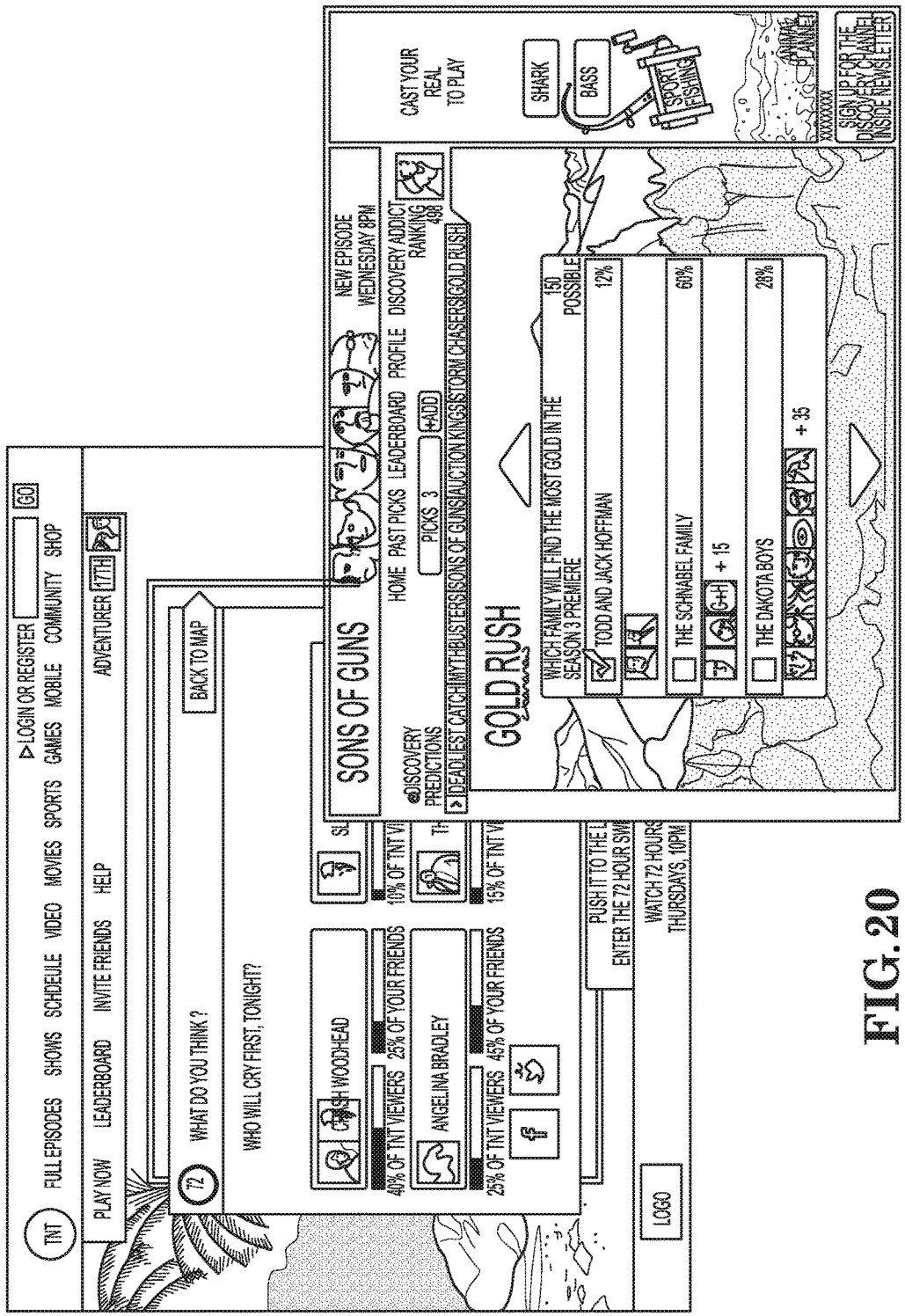
Figure 21:
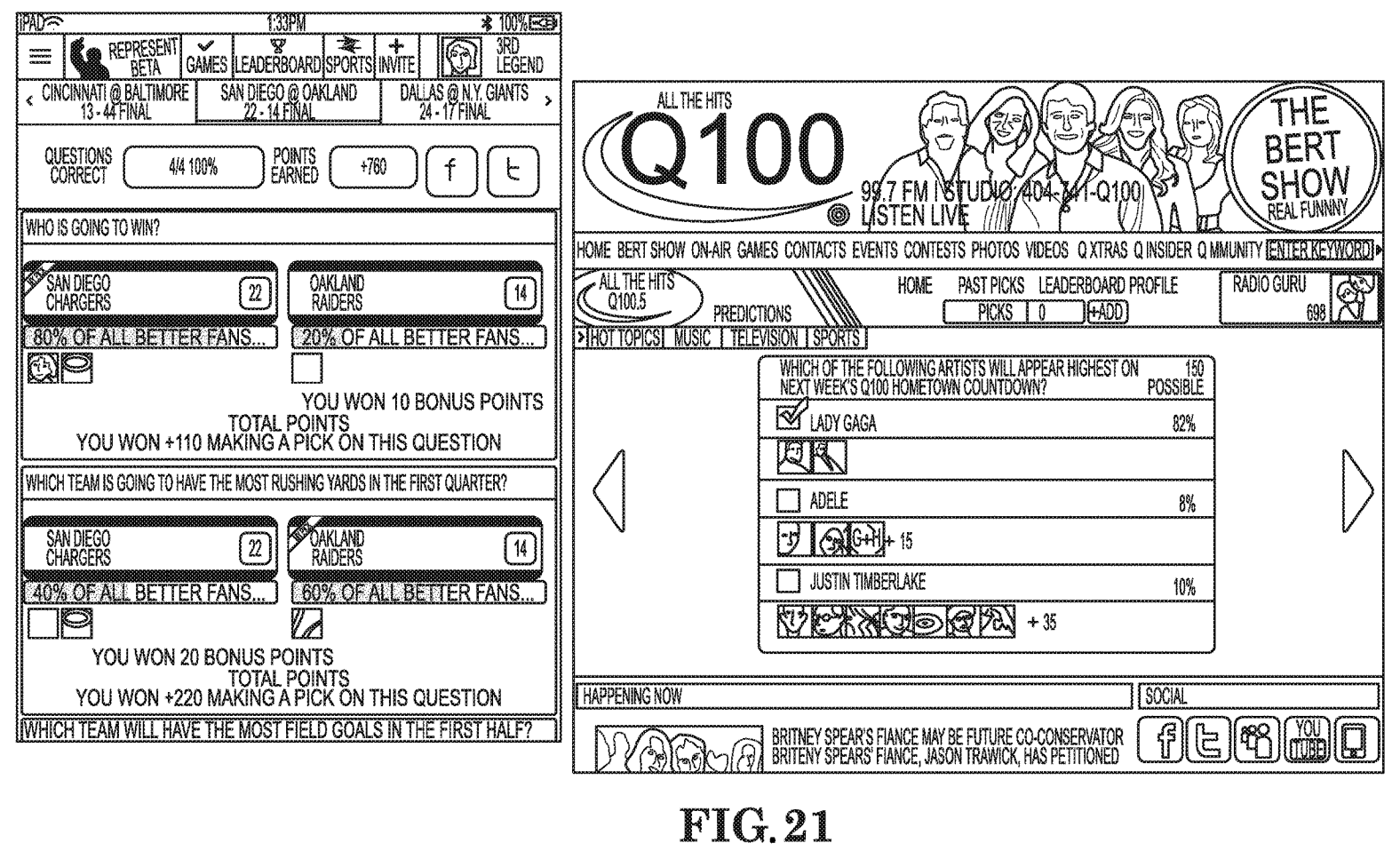
Figure 22:
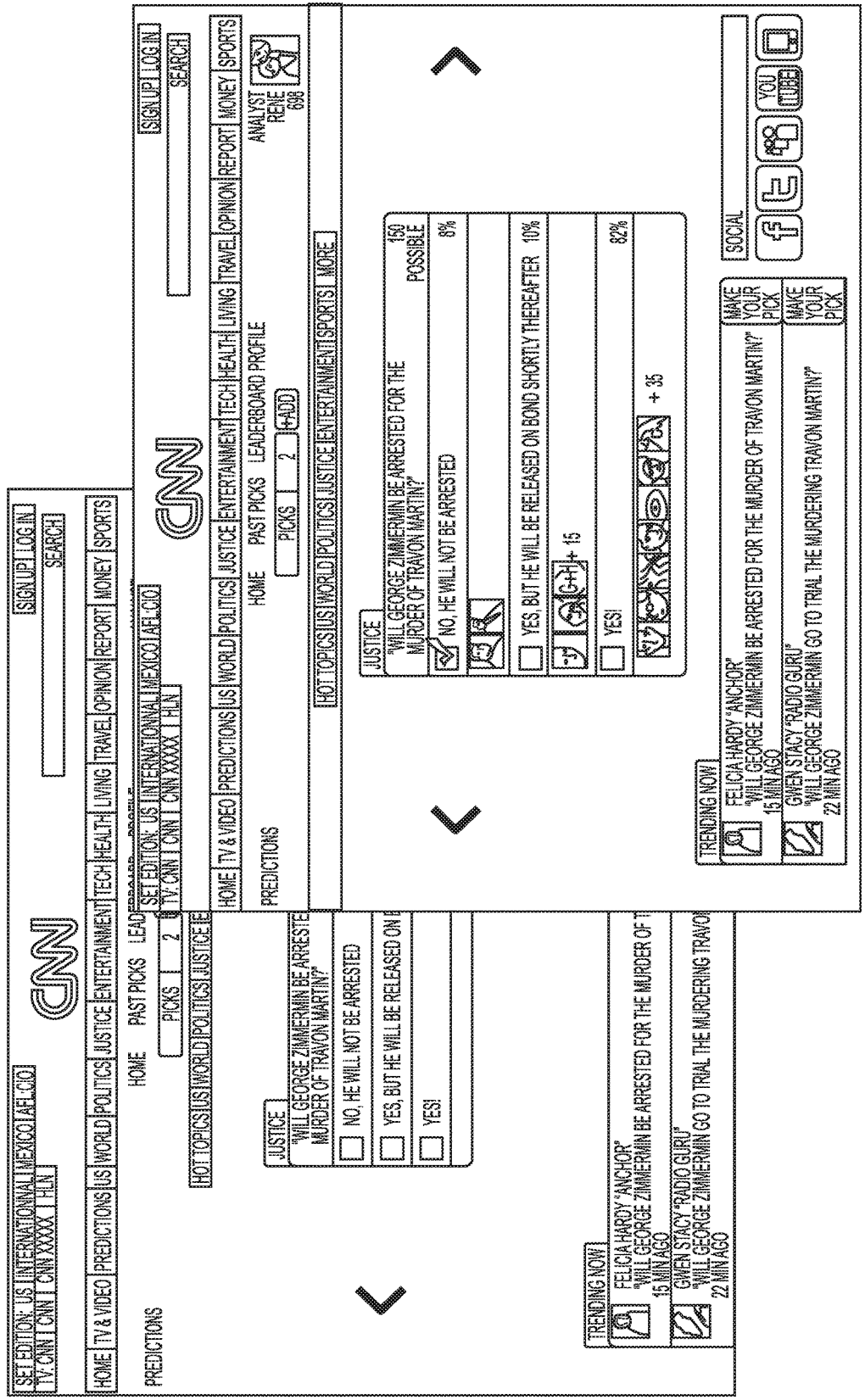
Figure 23:
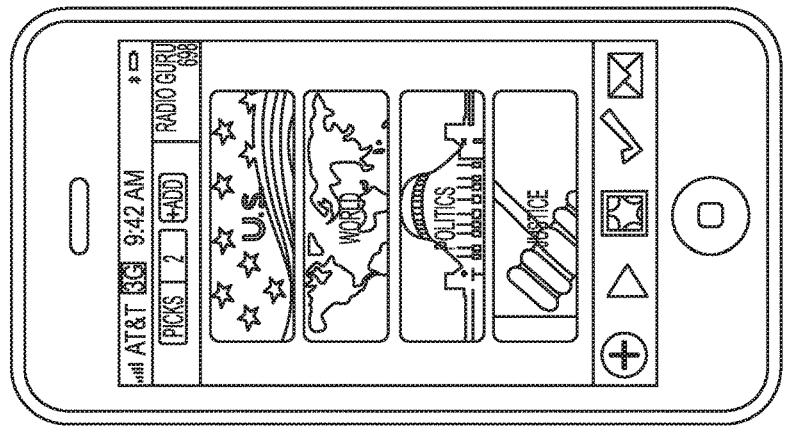
Figure 23:
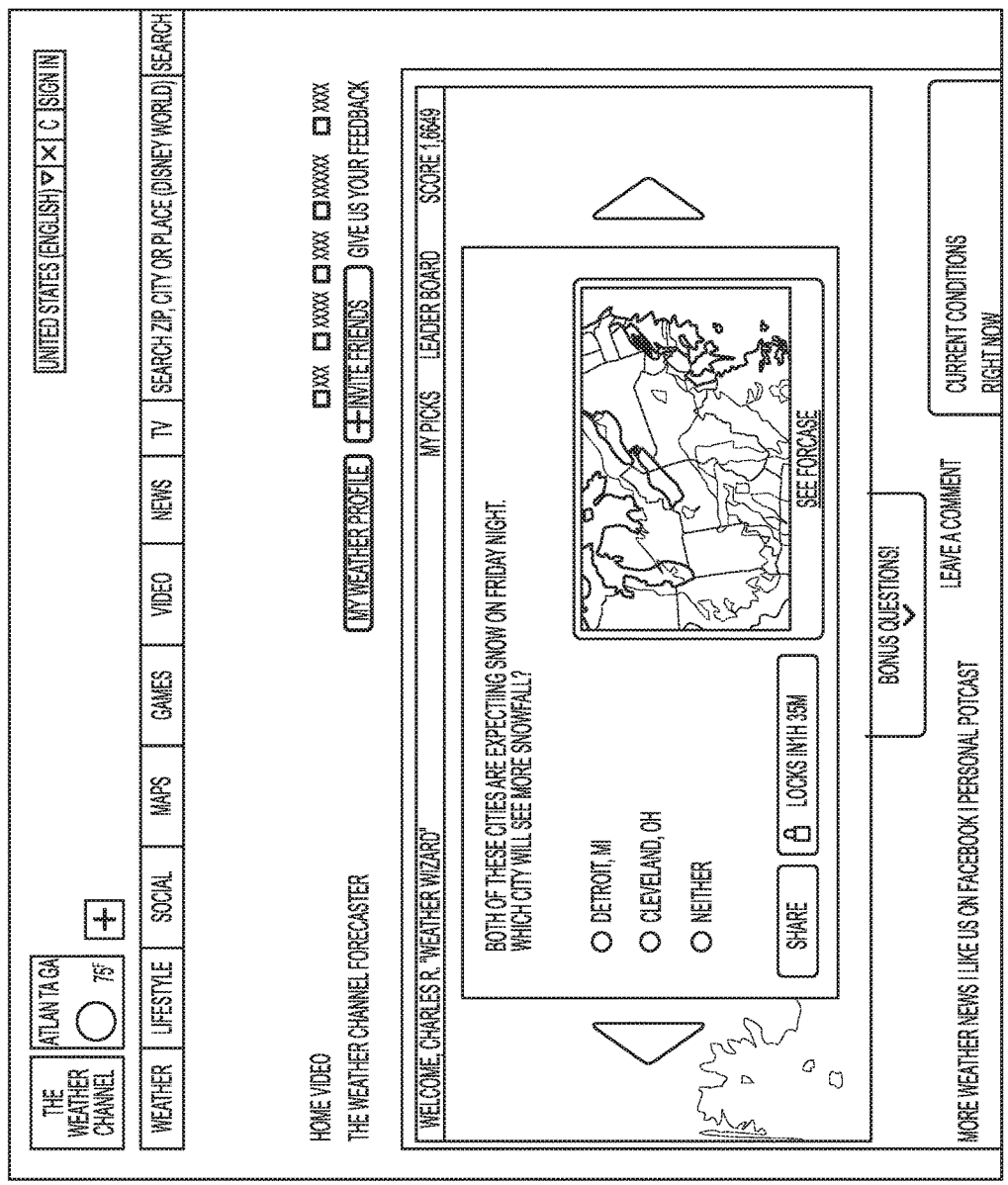

Although many of the systems and methods described herein are discussed in the context of fantasy football, the technology disclosed herein is also useful and applicable for a variety of sports and other quantifiable performances. For example, FIG. 19 illustrates game play examples relating to stock performance of companies, professional hockey, NASCAR and NCAA basketball. FIG. 20 illustrates game play examples for reality television program outcomes. FIG. 21 illustrates game play examples for rushing yards of professional football teams and for music record sales. FIG. 22 illustrates game play examples for politics and news outcomes. FIG. 23 illustrates game play examples for weather predictions and a selection of news events in categories such as U.S., world, politics and justice.

System

FIG. 1 is a schematic illustration of a system 100 for game creation and management, according to particular embodiments. As shown, the system 100 may include a variety of elements in communication with one another, including a content management system 200, application services 300, user interfaces 400, and a social reporting engine 500. The system 100 may also include a game content database 220, an active game-play database 320, a user database 520, and external data sources 380. The external data sources 380 may include external content sources 382 and external applications 388.

FIG. 1 also illustrates a system platform architecture, according to various embodiments. The game systems and methods described herein may be provided using a self-service platform that facilitates the creation and management of games through a friendly set of user interfaces 400. The system architecture, according to various embodiments, may include the components and modules illustrated in FIG. 1.

The application services interface 300, as shown, may include a REST API 370 to make calls to independent modules. REST (Representational State Transfer) is a style of software architecture for distributed systems, such as the internet. The REST API 370 allows for improved scalability, control of components and related rules, development of interfaces, and the deployment of additional components.

The Event Handler 460 according to particular embodiments includes a user interface that allows an unskilled user or Admin to create, edit, modify, and update a wide variety action-event combinations without any technical programming assistance. The user interface includes access to a wide variety of assets stored in a library—such as stock-photo image of social-media logos with clickable links, and the like—for the user to choose from. The user interface also allows the user or Admin to populate an entire series of event-action relationships in a user-friendly format. The user interface, for example, may include a series of drop-down menus with options for actions, events, and the rules associated with each (including, for example, usage counters, time/clock counters, and the like). The Event Handler 460 takes the user input and builds a series of computing instructions, such as decision trees and the like, for use by the game.

The gaming engine or system and the user's computing devices can be computing devices comprising a processor, non-transitory memory and software code stored in the memory to execute the specific functions and features of each of the respective gaming engine, systems and user computing devices.

Social Reporting Engine.

In another aspect, the game system 100, according to particular embodiments, is designed to facilitate the creation and play of a superset of games by providing a wide selection of game types and categories and by actively collecting user data across the entire superset of games using a module referred to as the Social Reporting Engine 500. The Social Reporting Engine 500, according to particular embodiments, gathers user data including user behavior during registration and use of the game system, during game play, during related interactions (such as answering surveys and responding to other types of calls to action), and during social-media actions (entering likes, sharing content, and the like)—across multiple games, over an extended period of time, resulting in the population and updating of potentially millions of user data profiles, which may be stored in a user database 520.

User data includes initial profile data provided voluntarily by the user, typically beginning with the sharing of information already contained in a Facebook profile, Twitter account, Foursquare history, or other integrated third-party application. The game system provider may also gather user data by query or otherwise at any time during membership. User data also includes game performance, by specific game played; including, for example, whether the user makes accurate predictions in a particular sport, and whether the user consistently likes or prefers a certain product, service, or company. In a preferred embodiment, user data will be aggregated in order to derive business intelligence and other useful information in a manner that does not sell or disclose personally-identifiable information. The user data may be provided in an aggregated or anonymized format; however, such user data is valuable because the user data collected and stored by the game system of the present invention includes a variety of useful demographic information, combined with a history of user behavior within the game system and related activities, as described herein. This combination of demographic information and actual user behavior contributes to the value of the user data collected and stored by the game system.

Head-to-Head Challenges

The systems and methods described herein include a head-to-head or direct challenge application and system, sometimes referred to herein as "Mano e Mano." A head-to-head or direct challenge as used herein refers to a direct challenge between two individual users of an application such as a game or fantasy sports application.

The challenge application, according to particular embodiments, may be configured to allow a first user to create a matchup, send a challenge to a second user, monitor the outcome of the matchup, process the challenge, identify the winner, calculate and post scores, and update leaderboards.

The challenger (first user) and second user need not be scheduled to pay each others' teams at the time the challenge is sent, accepted or when the activity that is the subject of the challenge will take place. For example, the challenger could be in a different league as the second user, or no league at all, the time the challenge is sent. Thus, the challenge can be a "side challenge" outside of the normal schedule of fantasy matchup games. The challenge between the first user and the second user can relate to any field of endeavor, including sports, politics, entertainment, current event, etc.

The challenge may be constructed according to the following general format: "A will [outperform or beat] B in [given performance] in [field of endeavor] during [this event or time period]." The outcome of the matchup may be determined by each rival's statistical performance in a real-world game or competition as the case may be.

The challenge application, as described herein, may be used to select the challenge subjects or rivals ("A" and "B") and create a challenge such as this one: "Barry Sanders will rush for more total yards than Marcus Allen during this Sunday's football game." The outcome may be determined or scored based on the real-world performance (total yards rushed) during the selected period (the Sunday football game).

Alternatively, the challenge can be formatted as a single player that will make some specific achievement in a given time period. An example of this would be to issue a challenge that "Barry Sanders will have more than 100 yards rushing in this Sunday's football game." The recipient of such challenge, if accepted, would thus be taking the position that Barry Sanders will not achieve the 100 yard rushing goal in this Sunday's game.

The Mano e Mano challenge application, according to particular embodiments, may be configured to allow users to create matchups by selecting players or rivals from a list, a database, or an external source of content.

Figure 2:
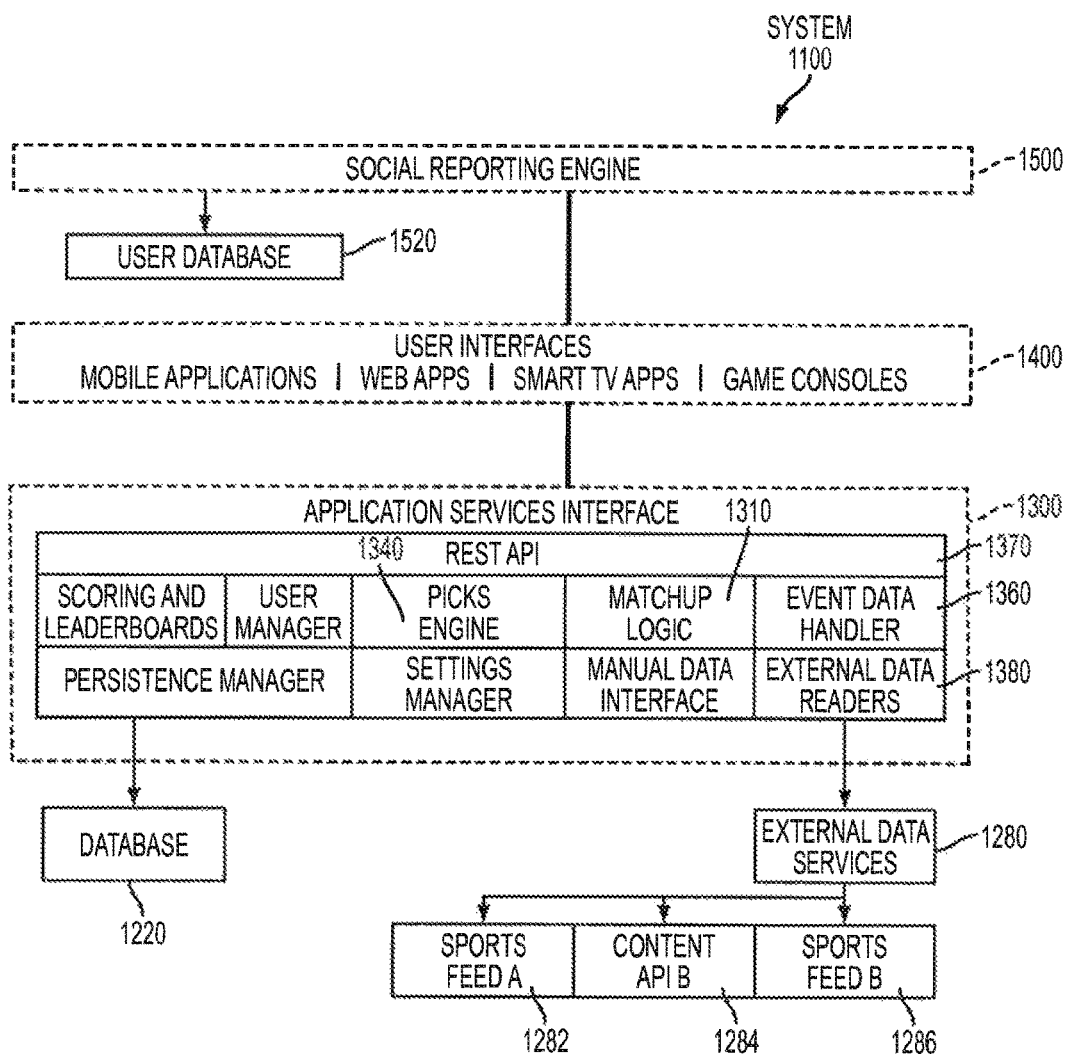
FIG. 2 is a schematic illustration of a system for managing head-to-head challenges in fantasy sports or other applications, according to various embodiments.

According to particular embodiments, FIG. 2 is a schematic illustration of a challenge system 1100 for generating and managing a plurality of direct challenges between users of a game application. As shown, the challenge system 1100 may include a variety of elements in communication with one another, including an application services interface 1300, a plurality of user interfaces 1400, and a social reporting engine 1500. The challenge system 1100 may also include a database 1220, a user database 1520, and one or more external data services 1280. The external data services 1280 may include a sports feed A 1282, a content API B 1284, and a sports feed B 1286, for example.

In alternative embodiments, the challenge system 1100 may include a content management system similar to the one depicted in FIG. 1.

The application services interface 1300, as shown, may include a REST API 1370 to make calls to independent modules. REST (Representational State Transfer) is a style of software architecture for distributed systems, such as the internet. The REST API 1370 allows for improved scalability, control of components and related rules, development of interfaces, and the deployment of additional components.

At the logic level, the application services interface 1300 in particular embodiments, as shown, includes modules for Scoring and Leaderboards, a User Manager, Picks Engine 1340, Matchup Logic 1310, and an Event Data Handler 1360. At the data level, the application services interface 1300 in particular embodiments, as shown, includes a Persistence Manger, Settings Manager, Manual Data Interface, and one or more External Data Readers 1380.

The challenge application, according to particular embodiments, may be implemented using a programmed computer. A direct challenge may be a contest between competitors or rivals (or perceived rivals) in any of a variety of fields of endeavor such as sports, politics, or entertainment. The challenge may be constructed in the following general format: "[First Competitor] will [outperform according to this performance parameter] the [Second Competitor] during [this event or time period]." The outcome or score of the challenge may be determined by comparing each competitor's actual performance; for example, in real-world games or competitions. The challenge application allows users to build each element of a direct challenge using an interface that is dynamic and user friendly. The challenge application may include any or all of the features and functions of the game systems described herein. For example, a challenge application may include access to game content or other data accessible by the system; for example, a photograph of one or both competitors.

In the context of a bracket game, the First Competitor and/or Second Competitor may be a player selected from any of the teams competing in the bracket. The performance parameter may be score more points. The time period may be during the second period of play in each respective Competitors' first game of the tournament. As illustrated in FIG. 2, schematically, the application services interface 1300 may include matchup logic 1310. Matchup logic 1310, according to particular embodiments, may include rules, logic, limits, and standard representations for the matchup data. The matchup data for the example above may include data or attributes to complete this sample challenge phrase: "First Competitor" will "score more points" than the "Second Competitor" during "the second period of play in each respective Competitors' first game of the tournament."

The picks engine 1340, according to particular embodiments, is configured to present options on a display and enable selections for users to pick. In another aspect, the picks engine 340 may also include rules, logic, limits, and standard data representations for the selections made by users. For example, the picks engine 340 for a particular game may display options to users according to rules and related conditions (whether this user has selected a time period or not, for example), and may limit user selections (not allowing picks to be changed once submitted, for example). The picks engine 1340 includes the data representation and specific processes for each challenge, as defined by the matchup logic 1310.

The event data handler 1360, according to particular embodiments, is configured to manage incoming data from each of the external data services 1280. Each external data service 1280 may have its own arrangement of data, which is different from other external data services. The event data handler 1360 includes a specific set of semantics for mapping the incoming data from each of the external data services 1280 to corresponding data locations according to the matchup logic 1310. In this aspect, event data handler 1360 parses, sorts, names, maps, and otherwise coordinates the incoming matchup data that is processed according to the matchup logic 1310.

The event data handler 1360, for example, may include semantics for mapping the incoming data about parameters such as the "starting roster" for real-world events like sporting events or competitions. Because the two competitors in a direct challenge may be playing in different games, on different days, the event data handler 1360 may be configured to receive and analyze data such as the "starting roster" in order to facilitate the building of a direct challenge.

The event data handler 1360, for example, may include semantics for mapping the incoming data about parameters such as the "start time" for real-world events like sports games. Because the two competitors in a direct challenge may not be competing against one another in a real-world game, and because their respective games may take place at different times, the event data handler 1360 handles start times and other parameters in order to facilitate the accurate gathering—and scoring—of data about each respective competitor in a direct challenge.

The matchup data, according to particular embodiments, may have the following attributes for describing and processing a direct challenge. For example, each Challenge may have these attributes: Event Date, Status (pending, in progress, completed, processed), and Source (the data feed or content service used to build the challenge and, later, to score the challenge). Each Challenge may include a Question with these attributes: Title, Mapping Pattern (the rules for calculating the score, such as the performance parameter and the time period), Correct Answer (including a reference to the Competitor who wins the challenge), and Score (the score defined for winning the challenge).

The Mano e Mano challenge application, according to particular embodiments, may be configured to allow users to build direct challenges by selecting competitors from a list, a database, or an external source of content. Information about upcoming competitions and games may be obtained from a variety of external data sources 1280 and presented to users as options in a drop-down list or other user-friendly interface. The challenge application may use a manual data interface, to allow challenges to be built by users without reference to external data.

In another aspect, the challenge application may be configured to automatically select and create a number of direct challenges between and among various competitors, and to then suggest such challenges to users for use in a direct challenge to a fellow user.

In particular embodiments, each external data source may have its own corresponding external data reader, which in turn uses its own corresponding event data handler. In this aspect, the system may include multiple external data readers 1380, and the event data handler 1360 may include multiple data handlers that work together to collect and organize data.

Head-to-Head Challenge Game Play

The following description and figures describe one example of the process of building a direct or head-to-head challenge. A direct challenge may be constructed in the following general format: "[First Competitor] will [outperform according to this performance parameter] the [Second Competitor] during [this event or time period]." In the following example, a first user (the Kehoesabe team) sends a direct challenge to a second user (the Dragon Army team), asserting that a First Competitor (Knowshon Moreno) will achieve more total yards than a Second Competitor (Matt Forte), during an entire day, placing a non-currency (non-monetary) wager in the amount of 500 fantasy dollars, and paying a fee of 99 cents to cover both players.

In an alternative embodiment, the first user may send a direct challenge to all his friends, to all users in a particular group or category, or to all users system-wide. In this aspect, the direct challenge may be constructed and issued to a select group of users as an invitation to compete.

Figure 3:
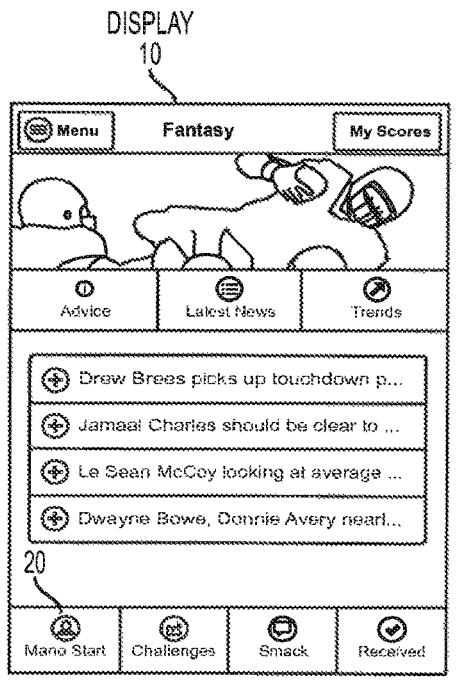
Figure 4:
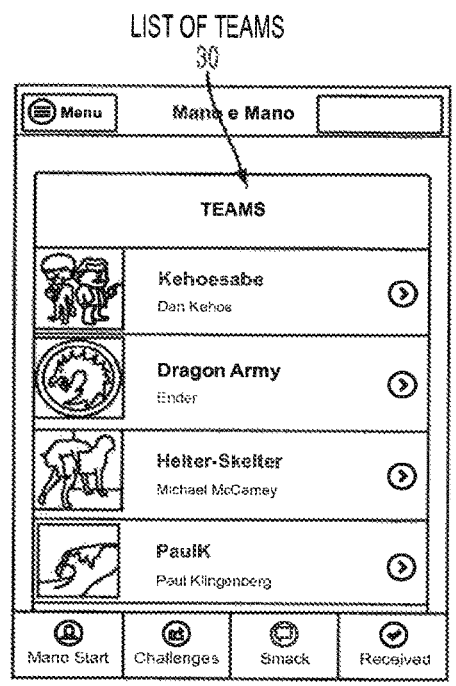

FIG. 3 illustrates a display 10 and includes a start button 20 (labeled Mano Start) for initiating the process of building a direct challenge. Next, when the button 20 is selected, the challenge application, according to particular embodiments, may open a display showing a list of teams or opponents 30 (or other users in a group, league or contacts of the user), as shown in FIG. 4. In this example, each team represents a Fantasy Sports Team, which is a collection of players selected by a particular user. In this aspect, the list of teams 30, in effect, represents a list of users.

Figure 5:
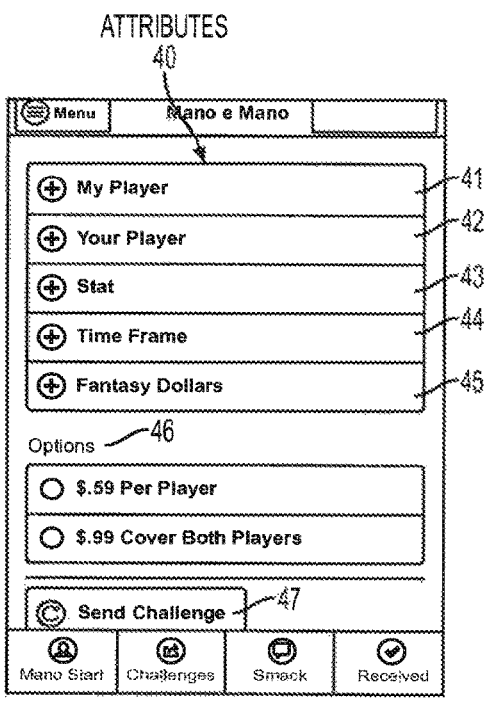

In this example, the first user is the user who owns the Kehoesabe team. The first user may select an opponent—here, he selects the Dragon Army team—after which, according to particular embodiments, the challenge application opens a display listing the attributes 40 of the challenge, as illustrated in FIG. 5. The attributes 40 include selectable icons for My Player 41 (or the First Competitor), Your Player 42 (the Second Competitor), Stat 43 (the performance parameter), Time Frame 44 (the time period), Fantasy Dollars 45 (an optional, non-currency wager on the outcome), Options 46 (for making payment to the provider of the direct challenge feature or other participating entity), and Send Challenge 47 (for sending the direct challenge once all the attributes have been selected).

Figure 6:
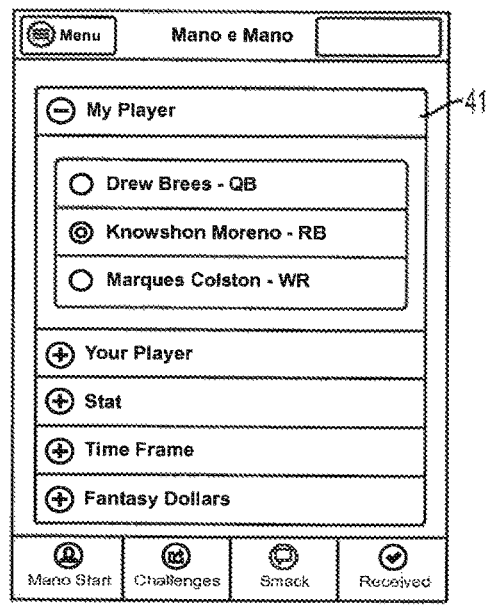

As shown in FIG. 6, in response to selecting My Player 41, according to particular embodiments, the challenge application opens a display of competitors (on the first user's own team) who may be selected as the First Competitor for the direct challenge. In this example, the first user selects a player named Knowshon Moreno. The user can also be provided with the ability to perform research on each member of the list of available players. An example of the research screen is shown in FIG. 30.

Figure 7:
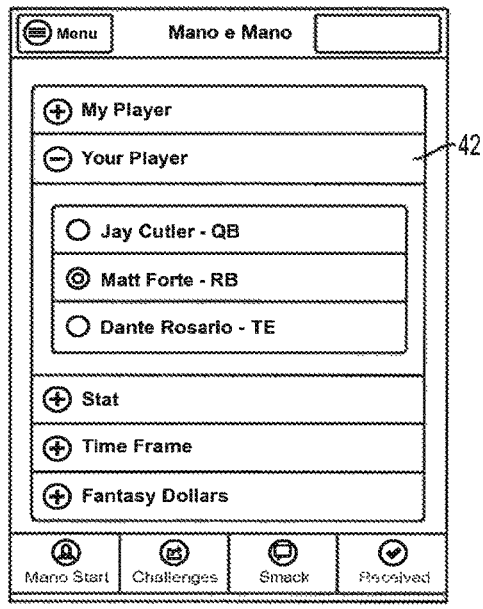

As shown in FIG. 7, in response to selecting Your Player 41, according to particular embodiments, the challenge application opens a display of competitors (on the opposing second user's team) who may be selected as the Second Competitor for the direct challenge. In this example, the first user selects a player named Matt Forte.

Figure 8:
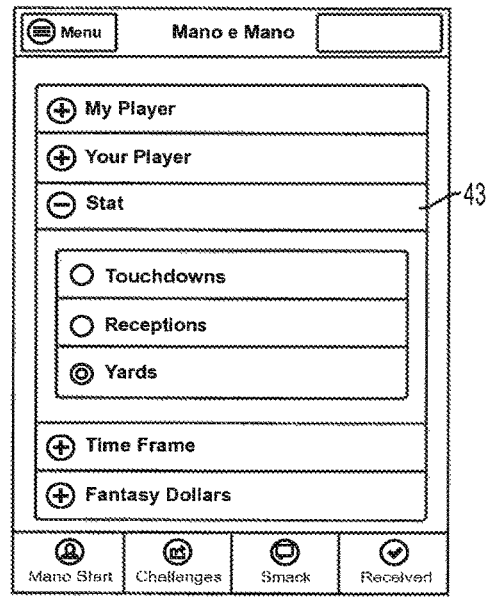

As shown in FIG. 8, in response to selecting Stat 43, according to particular embodiments, the challenge application opens a display of statistics or other performance metrics that are available for this particular competition. In this example, the available metrics include Touchdowns, Receptions, and Yards. In this example, the first user selects Yards. For a basketball competition, for example, the available metrics may include Rebounds, Free Throws, and Three-Point Goals.

Figure 9:
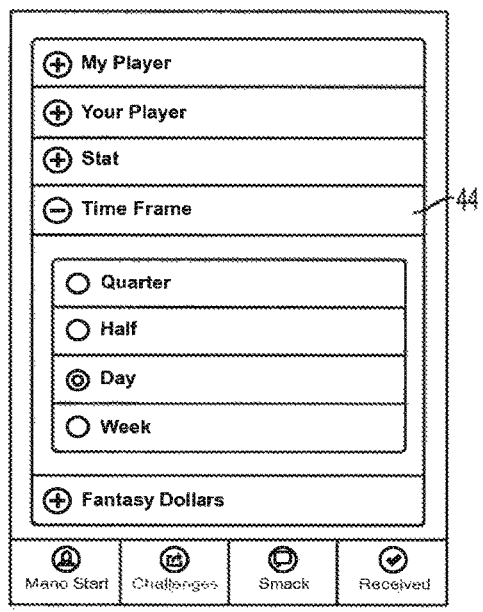

As shown in FIG. 9, in response to selecting Time Frame 44, according to particular embodiments, the challenge application opens a display of time periods, durations, or other temporally limited parameters that are available for this particular competition. In this example, the available time frames include Quarter, Half, Day, and Week. In this example, the first user selects Day.

Figure 10:
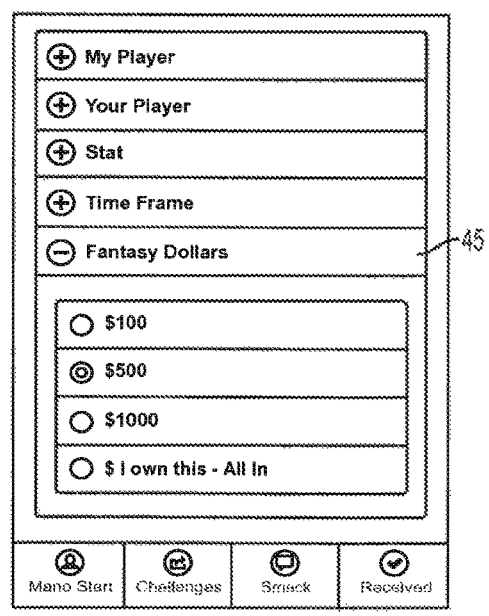

As shown in FIG. 10, in response to selecting Fantasy Dollars 45, according to particular embodiments, the challenge application opens a display of non-currency (non-monetary) wager amounts. In this example, the available wagers include $100, $500, $1000, and $ I Own This All In. In this example, the first user selects $500.

As shown in FIG. 11, in response to selecting Options 46, according to particular embodiments, the challenge application opens a display of payment options. In this example, the available payment options include $0.59 per Player or $0.99 Cover Both Players. In this example, the first user selects $0.99 Cover Both Players.

As shown in FIG. 12, in response to selecting Send Challenge 47, according to particular embodiments, the challenge application displays a notice 50 confirming that the direct challenge has been sent to the second user (owner of the Dragon Army team). If no second user has been selected, the challenge may be published or displayed to a selected subset of users or to all users, as an invitation to compete.

FIG. 13 illustrates the presentation of a direct challenge to the second user, according to particular embodiments of the challenge application. As shown, the challenge application may display the two Competitors (along with related information), the challenge metric ("Total Yards"), the time period (date), and the fantasy wager. The display may also include a message about which user paid the fee.

As shown in FIG. 13, the challenge application, according to particular embodiments, includes a display of reply attributes 60 for use by the second user upon receiving the direct challenge. The reply attributes 60 includes selectable icons for Accept 61, Decline 62, and Counter 63. In response to selecting Accept 61, the challenge application sends a notice to the first user that the challenge has been accepted without changes. In response to selecting Decline 62, the challenge application sends a notice to the first user that the challenge has been declined. In response to selecting Counter 63, the challenge application provides a series of displays to the second user, along with selectable icons for making changes to the attributes of the direct challenge. When completed, the challenge application provides the second user with a "Send Challenge" icon in order to send the amended challenge (the Counter) back to the first user for consideration.

Figure 31:
FIG. 31 illustrates a Head to Head Record pop up showing relevant historical data from particular opponents, according to various embodiments.
Figure 32:
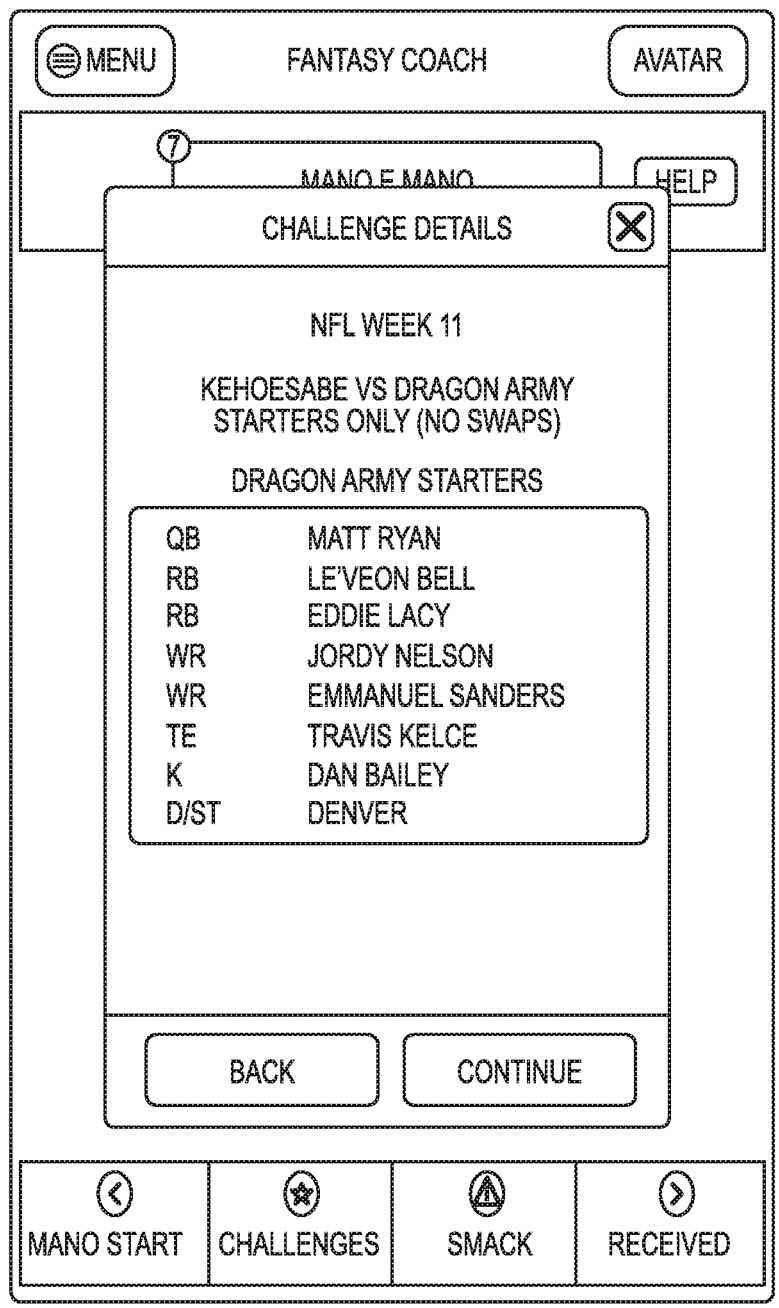
FIG. 32 illustrates a whole lineup challenge feature, according to various embodiments.

FIG. 14 illustrates a list of challenges 70 on a display. In response to selecting the icon labeled Challenges 22, the challenge application displays a list of challenges 70 along with one or more filters or categories. In this example, the list 70 includes the name of the opposing user (the second user), the title of the challenge, the score, the date, the status (won or lost), and the wager amount if any. A column for head-to-head record of particular opponents can also be provided in addition to, or instead of, other columns of data. A Head to Head Record pop up can also be provided to the user in certain alternatives as illustrated in FIG. 31. The pop up shows relevant historical data from particular opponents. The user can also submit a whole lineup challenge as is illustrated in FIG. 32.

Referring again to FIG. 3, another feature of certain embodiments is a chat feature where competitors can discuss or talk "smack" about the challenge or other topics. The user selects the "Smack" button along the bottom row of buttons to be taken to the "smack" talk chat screen. The chat usage is then similar to a messages application in certain embodiments.

Two-Versus-Two Direct Challenges and More

The challenge application, according to particular embodiments, may be configured to allow users to build a two-versus-two challenge; that is, a contest between two first competitors and two second competitors. In this aspect, the First Competitor may be a group of two or more, and the Second Competitor may be a group of two or more, where both groups have the same number of participants. In this embodiment, each pair of opposing competitors may have its own performance parameter (rushing yards or total yards, for example), each pair may have its own wager and/or fees, and the time period may be long enough to include several real-world games. In this aspect, the challenge application may be configured to facilitate the building of challenges with three or more competitors—or an entire team—on each opposing side. The challenge application can further alternatively be configured to allow one or more competitors to play direct challenges against a "house" user much like a blackjack player plays against the house while there are other simultaneous users sitting at the same table also playing against the same house.

Social Reporting Engine for Challenges

In another aspect, the challenge system 1100, according to particular embodiments, is designed to facilitate the creation and play of a plurality of direct challenges and to actively collect user data across an entire superset of challenges between users using a module referred to as the Social Reporting Engine 1500, as shown in FIG. 2. The Social Reporting Engine 1500, according to particular embodiments, gathers user data—including user behavior during registration and use of the game system, during game play, during interactions, during social-media actions, and during challenges—across multiple games, over an extended period of time, resulting in the population and updating of potentially millions of user data profiles, which may be stored in a user database 1520.

User data includes initial profile data provided voluntarily by the user. The challenge system and/or game system provider may also gather user data by query or otherwise at any time. User data also includes game performance by specific game played; including, for example, whether the user makes accurate predictions in a particular sport, and whether the user consistently likes or prefers a certain product, service, or company. In a preferred embodiment, user data will be aggregated in order to derive business intelligence and other useful information in a manner that does not sell or disclose personally-identifiable information. The user data may be provided in an aggregated or anonymized format; however, such user data is valuable because the user data collected and stored by the game system of the present invention includes a variety of useful demographic information, combined with a history of user behavior within the game system and related activities, as described herein. This combination of demographic information and actual user behavior contributes to the value of the user data collected and stored by the game system.

Crowd Wisdom from Challenges

In another aspect, the social reporting engine 1500, according to particular embodiments, includes a crowd wisdom module for analyzing and ranking a number of head-to-head challenges, by subject, over a predetermined time period, in order to identify the crowd wisdom about a particular subject. In use, the module may identify a subset of challenges that are most often correct about a particular subject, and build a report about that subset for a customer.

In this aspect, the crowd wisdom module is tasked with exploring a particular subject (sports, movie awards, and the like), identifying the challenges that are most often correct about the subject, and analyzing those predictions over a period of time for consistency and accuracy. Because the challenge system 1100 includes a large number of players, participating in multiple head-to-head challenges, over an extended period of time, the challenges that are most often correct represent the crowd wisdom of all the players who use the challenge system. In the commercial context, the crowd wisdom has value because it represents actionable business intelligence that is useful in a variety of contexts.

Crowd Guru for Challenges

In a related aspect, the social reporting engine 1500, according to particular embodiments, includes a crowd guru module for analyzing and ranking a number of head-to-head challenges, by user and by subject, over a predetermined time period, in order to identify an expert subset of users (i.e., the crowd gurus) who most often win challenges about a particular subject. In use, the crowd guru module may identify the users who are most often winning challenges about a subject, and may report the identity or those gurus to a customer.

In this aspect, the crowd guru module finds those users who most often win challenges about a particular subject (sports, movie awards, and the like) and identifies each such user as a Crowd Guru. According to particular embodiments, each user's challenges are analyzed over time, by subject, to determine the user(s) who win challenges most often. Because the game system includes a large number of players, participating in multiple head-to-head challenges, over an extended period of time, the users who win challenges most often may be identified as Crowd Gurus about that particular subject. In the commercial context, the game challenges made by a Crowd Guru, or a subset of Crowd Gurus, has value because it represents actionable business intelligence that is useful in a variety of contexts. The crowd guru module will score users on the number of challenge wins, in specific verticals, and aggregate the challenges made by the top experts (the Crowd Guru performers who are members of a rolling list, based on most-recent results), analyze the data using the Social Reporting Engine 1500 and other tools, and use that data to generate Crowd Guru data for commercial sale, presented for example in the business intelligence reporting console, described herein.

The crowd guru module, according to particular embodiments, is configured to identify the best-performing users in each game category, by aggregating challenge scores and wins over time, by category or by other selected metric, and maintain a rolling subset of top performers. For example, the Top 5% Winners of Monday Night Football Challenges, the Top 10% Winners of Challenges During March Madness, and the like.

In this aspect, the challenge system 1100 and social reporting engine 1500 may be used to identify: (a) the Crowd Wisdom related to a particular topic, and/or (b) the Crowd Guru performers, based on their actual win/loss performance across a subset of head-to-head challenges about the topic. Unlike existing tools sometimes referred to as prediction engines, the crowd wisdom module and crowd guru module will be based on actual performance in head-to-head challenges.

Head-to-Head Challenges System Architecture.

Figure 15:
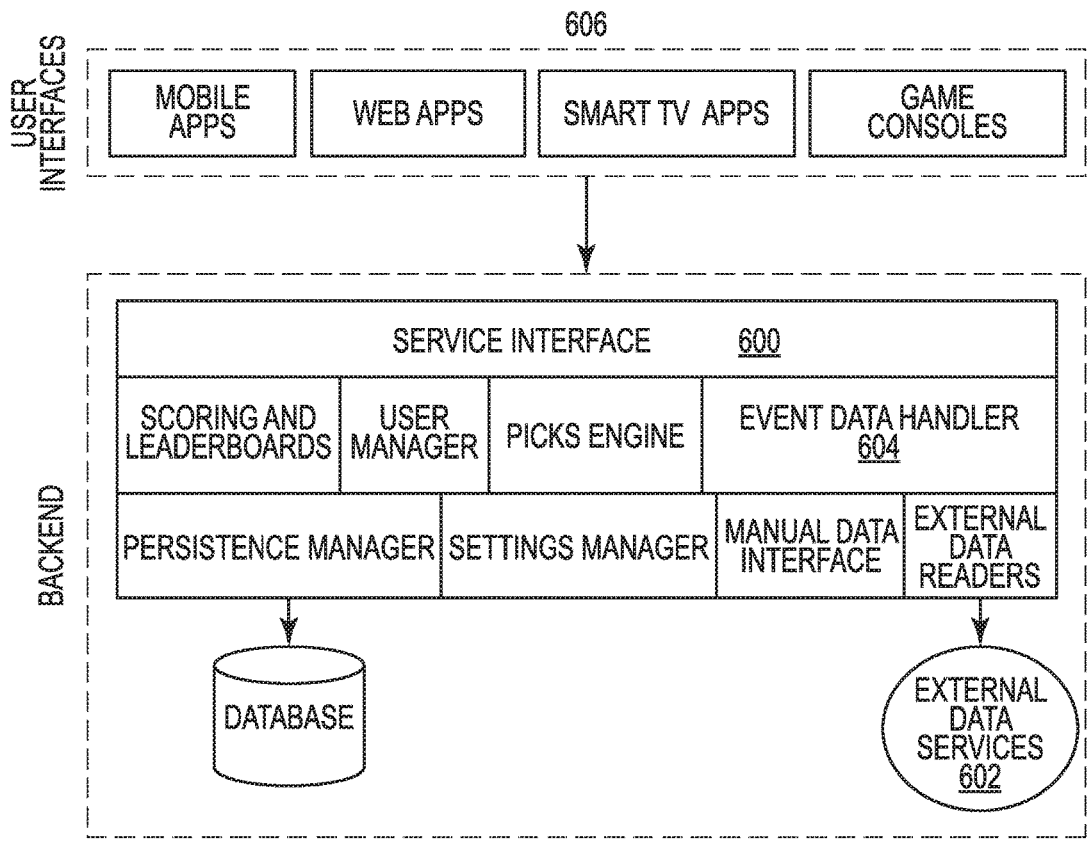
FIGS. 15 through 18 are diagrams of aspects of system architecture for head-to-head challenges, according to various embodiments.

Referring to FIGS. 15-18 additional aspects of system architecture relating to direct challenges or "Mano e Mano" will be discussed. FIG. 15 depicts a service interface 600 and various related elements of the direct challenge application, according 624g to various embodiments.

The direct challenge application may be in communication with an incoming data feed from external sources 602, such as one or more sports information feeds. For each data source (internal or external) there may be an Event Data Handler 604 that is configured to manage the data source, the competitors, the matchups created by users, the real-world event times and outcomes, and the quantitative statistics and performance of competitors.

The Service Interface 600 is interacted with by the user through a variety of User Interfaces 606, including Mobile Apps (e.g. on smartphones and tablet computers), Web Apps, Smart TV Apps and on gaming consoles. Computer kiosks can also be provided that are networked with the Service Interface to allow users to interact with the gaming system.

Figure 16:
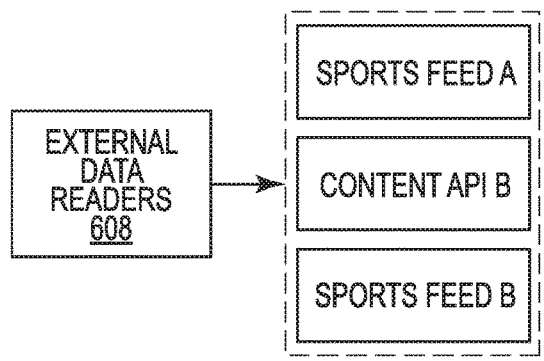

Referring to FIG. 16, the direct challenge system can utilize one or more external data readers 608, such as sports feeds A, B, etc., and content APIs to gather challenge data available from external data services like sport feeds and other content providers. Data for challenges can also be fed into a statistics database manually.

Figure 17:
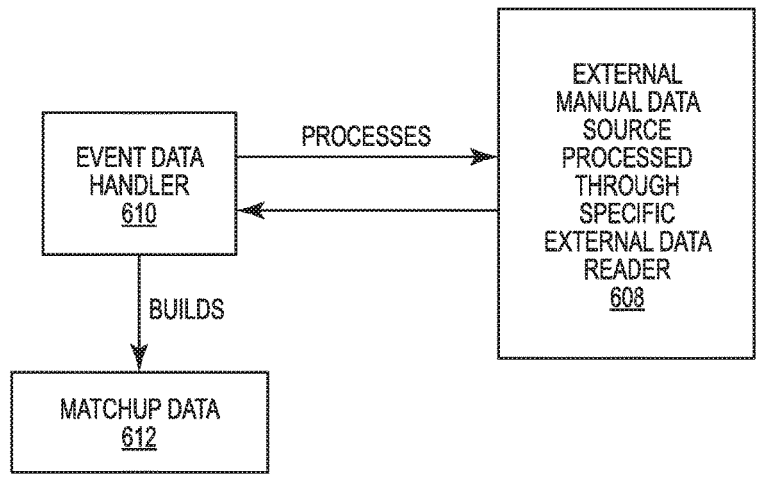

Referring to FIG. 17, data inbound to the challenge system from the external data readers 608 may have specific formatting of the data such as event date, competitors, quantitative stats, etc. needed by the challenge system. An event data handler 610 translator can be provided to transform the data from such external sources into a common matchup data 612 format to be used by the challenge system. This can be accomplished, for example, through the use of XML data forms.

For each data source there is an event data handler that manages data sources and creates a series of possible and actual matchups, combining competitors, event times and quantitative statistics. Matchups can be automatically created by the challenge system based on system business logic and suggest such matchups to users.

Figure 18:
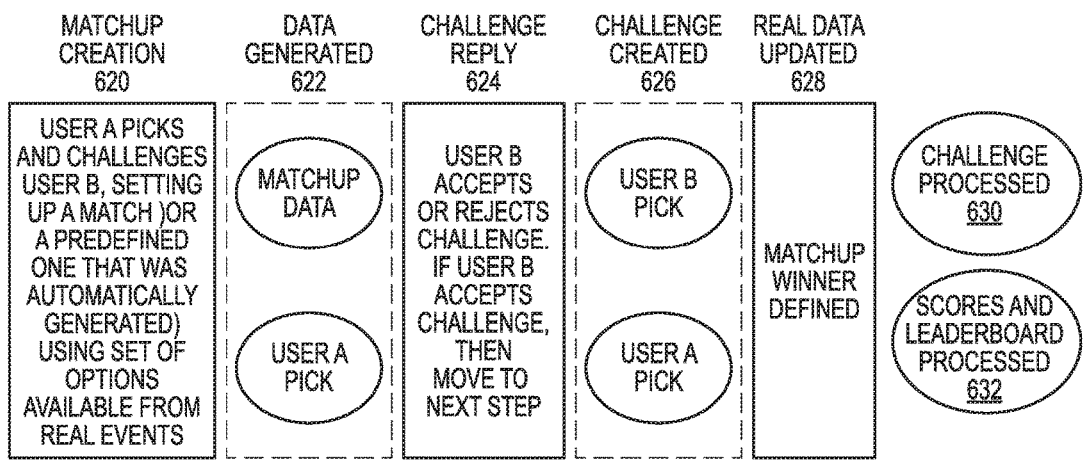

Referring to FIG. 18, the challenge application may be configured to proceed from a starting point 620 in which User A selects a competitor (manually, or using a picking engine, for example) and selects one of the competitor's rivals, thereby identifying a matchup. The challenge application may further be configured to allow User A to select the parameters necessary to create a challenge 622; for example, "[Competitor] will [outperform] [Competitor's Rival] in [this field of endeavor] during [this event or time period]." Once the challenge is created, User A may use the challenge application to select a fellow user, User B, and then issue the challenge to User B.

User B may accept or reject the challenge 624. If the challenge is accepted, them the challenge is officially created 626. The challenge application is configured to monitor the performance of the competitor and rival, identify the winner of the matchup 628, process the challenge 630, and post scores to a leader board 632.

In another aspect, the challenge application may be configured to automatically select and create a number of matchups between and among various competitors, and to then suggest such matchups to users for use in a challenge.

Bet not Buy Game Play

In another variation of the invention, a direct challenge can be created in the form of a predictive wager by a user regarding the predicted performance of a particular player or players in a particular parameter in a particular event. For example, the user can make a direct challenge to the house (e.g. a casino or sports book) that a specific kicker in a pro football game being played will make a kick that is going to be imminently attempted. Another example could be that a specific player playing a game that day will achieve a specific numerical performance (e.g. Adrian Petersen as running back for the Minnesota Vikings will achieve more than 100 yards rushing in that day's game). The amount of the wager is designated and sent to the house to be accepted, declined or countered. The challenge is then scored and the winner determined. The user's internal account, external account such as a bank account, credit card, etc. is then debited or credited accordingly. The user can also pay using methods such as Bitcoin or other virtual currency, or via payment services such as PayPal and the like.

Of course, the subject of the challenge need not be a sports player—any quantifiable performance can be the subject of such a challenge. For example, a user could pace a challenge to the house that a particular financial stock will achieve a specific performance metric on a given day or portion of a day (e.g. CAT stock will rise 2% before the closing bell). Again, the wager is sent to the house for approval, decline or countering. The challenge is then scored and the winner determined. The user's account, credit card, etc. is then debited or credited accordingly.

This system and method of direct challenges allows the user to bet or wager on particular performances of persons and things without the need to buy that person or thing. In the sports player example, the player at issue need not be on the user's fantasy team or roster. The challenge can be made for any player regardless of roster. Thus the user can follow and bet on favorite players that the user does not even "own." In his or her league play. The user does not even need to be in a league. Likewise, the user can wager on the performance of a particular stock without ever having to buy that stock. This approach avoids broker and other transaction fees as well.

The casino or sportsbook maintains the database containing each user's ledger according to conventional accounting and security standards.

A single user can also act as a "house" player in that he or she can make several direct challenges against other users or receive several direct challenges from other users, or any combination thereof. In this scenario, the casino or sports book can facilitate the challenge and keep a percentage of the wager (or a flat amount) as compensation. The casino or sports book can temporarily hold the wagered funds for both sides of the challenge in an escrow account as soon as the challenge is consummated. This ensures that the challenger user and the challenged user both have sufficient funds to pay the winner of the challenge.

In another alternative, the house can act as a matchmaker or betting exchange where a user's challenge is matched up with or presented to multiple other users in order to consummate a challenge. Thus, the challenging user need not send the challenge to a specific target user. Instead the challenge is placed to the exchange (gaming engine) and the matching engine included within the gaming engine or exchange will propose the challenge to other users that may be interested in accepting the challenge. The matching engine can use algorithms to determine likely successfully challenge recipients. For example, metrics such as type of event at issue, size of wager, time frame, player or performer at issue, etc. that match up to the parameters of other user's challenge histories can indicate a target user that may be likely to accept the subject challenge. The matching engine can also perform matches based upon winning percentages of the challenger and potential challenge recipients. Thus, the exchange or matching engine predictively can match up opponents for challenges. Users that do not have a history of challenges yet can be matched based upon a preferences query as part of a registration process, or by the new user accepting challenges either from the house or directly from other users.

The direct challenges can be made using a computing device coupled to a gaming engine just like what was described for head-to-head challenges herein above.

The time frame for performance of the bet not buy direct challenges can be any desired range. For example, the duration of the performance could be for the outcome of a whole season of play, or the performance could be for an increment of a minute, hour, day, or any multiples thereof. The wager could also be tied to a particular event, such as a conclusion of a game or the announcement of a contest winner or other decision.

Monetary wagering may be prohibited in certain venues, so alternative non-monetary wagers can be used instead. For example, virtual currency, performance points for winning awards, prizes, sweepstakes entry, etc. can also be used in the alternative to currency.

The house can also initiate a challenge to one or more users.

Algorithms can be used by the gaming engine to ensure that competitors with exceptional circumstances (financial reporting, abnormal trading volume, insider relationships, company news, athlete injuries, etc.) are not able to be included or available for challenges where wagers are beyond their means or their participation would be prohibited for some reason. Similarly, the gaming engine can remove one or more players from being able to be the subject of a challenge where circumstances wagering on the player's performance would be unfair, harmful or for any other reason.

Casino patron points can be accrued for direct challenge activity by a user in similar manner to other casino games. In addition, or alternatively, wager amounts and winnings can be used to award users with in-game achievements, levels, badges or other rewards.

The challenger or the house can offer odds for the predicted outcome, or the wagering can be straight up (no odds).

The house can maintain a public leaderboard for winning percentages and total winnings, or other metric. The house can optionally allow users to opt out of listings in public leaderboards.

Examples of bet not buy direct challenges include: whether a specific stock or commodity will increase or decrease in value over a predetermined amount of time; whether a horse in a specific lane will outperform the horses in a different specific lane over the next three upcoming races; whether a specific athlete A will outperform specific athlete B in a statistical category over a predetermined period of time; whether one stock, commodity or athlete will outperform another in a statistical category over a short, predetermined amount of time; and whether one specific stock or commodity will "peak" or reach a certain level at any time during the predetermined wagering period.

Security can be enhanced by the house maintaining a secure server on its premises for game play on secure local area network connects to centralized server through encrypted, private, wide area network. Biometric security can be provided for a user to receive game play token. User device IDs can be recorded and monitored by the game play engine. The user devices can be provided with secured access dongles. The house can also require that the users must play on casino or other gambling site's secure Local Area Network. Geolocation tracking of the user's device can be performed to ensure that the user remain in areas where gambling is legal or permitted.

Referring now to FIGS. 24-29, an example of a bet not buy direct challenge will be discussed with reference to an example graphical user interface.

Figure 24:
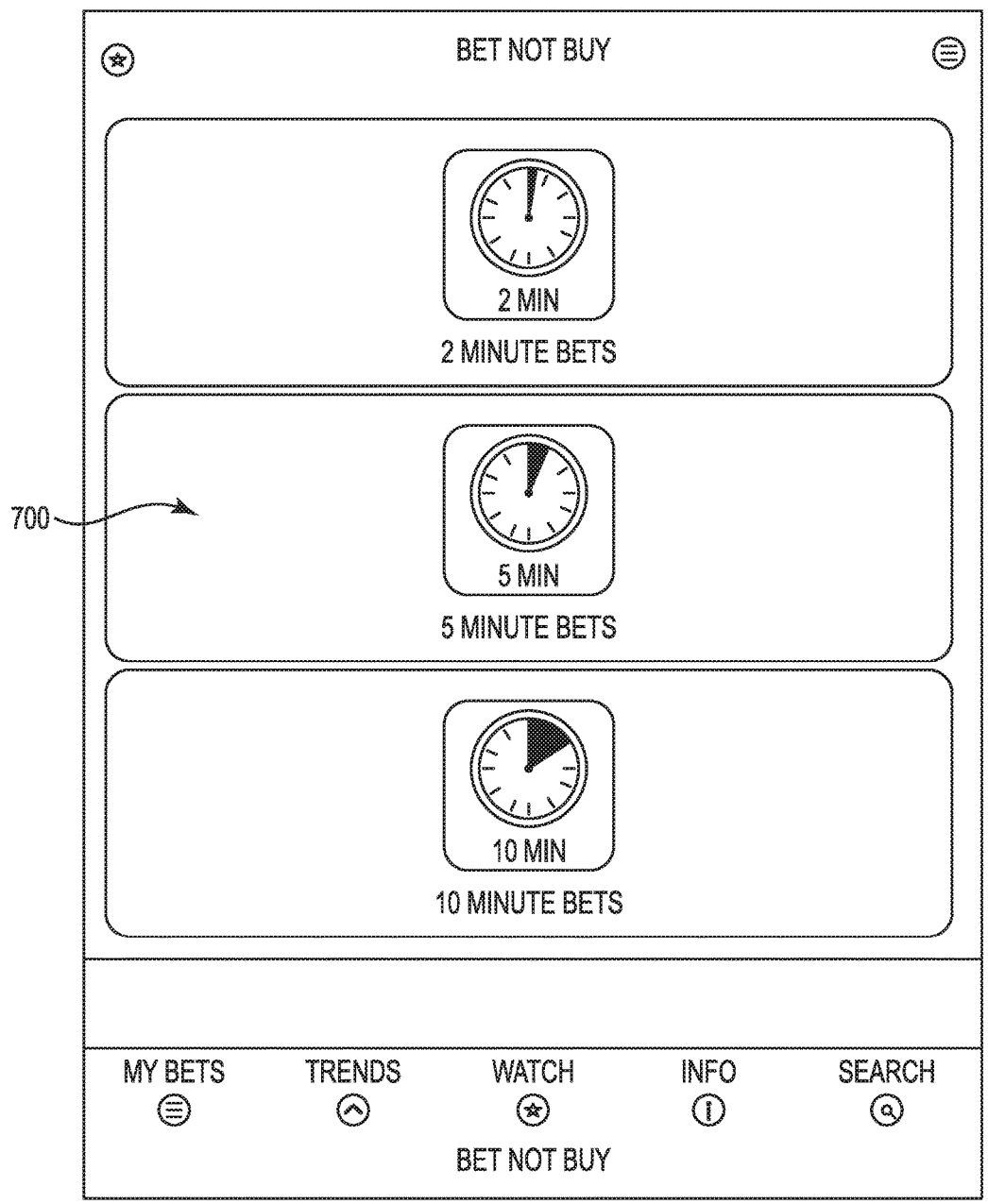
Figure 25:
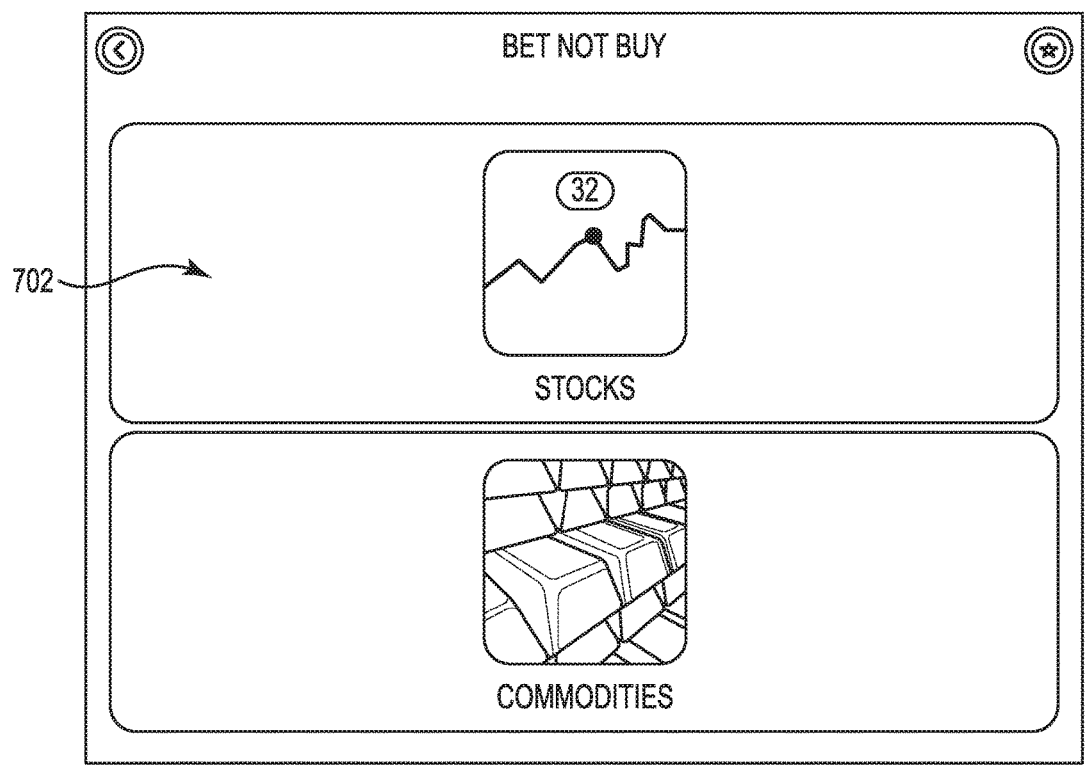

Once the user launches the bet not buy application on their computing device they may be presented with a screen as shown in FIG. 24. This screen allows the user to designate the time duration of the challenge 700. As shown in FIG. 25, after selecting the time duration, the user is provided with options to select the subject matter of the challenge 702, such as stocks, commodities, etc.

Figure 26:
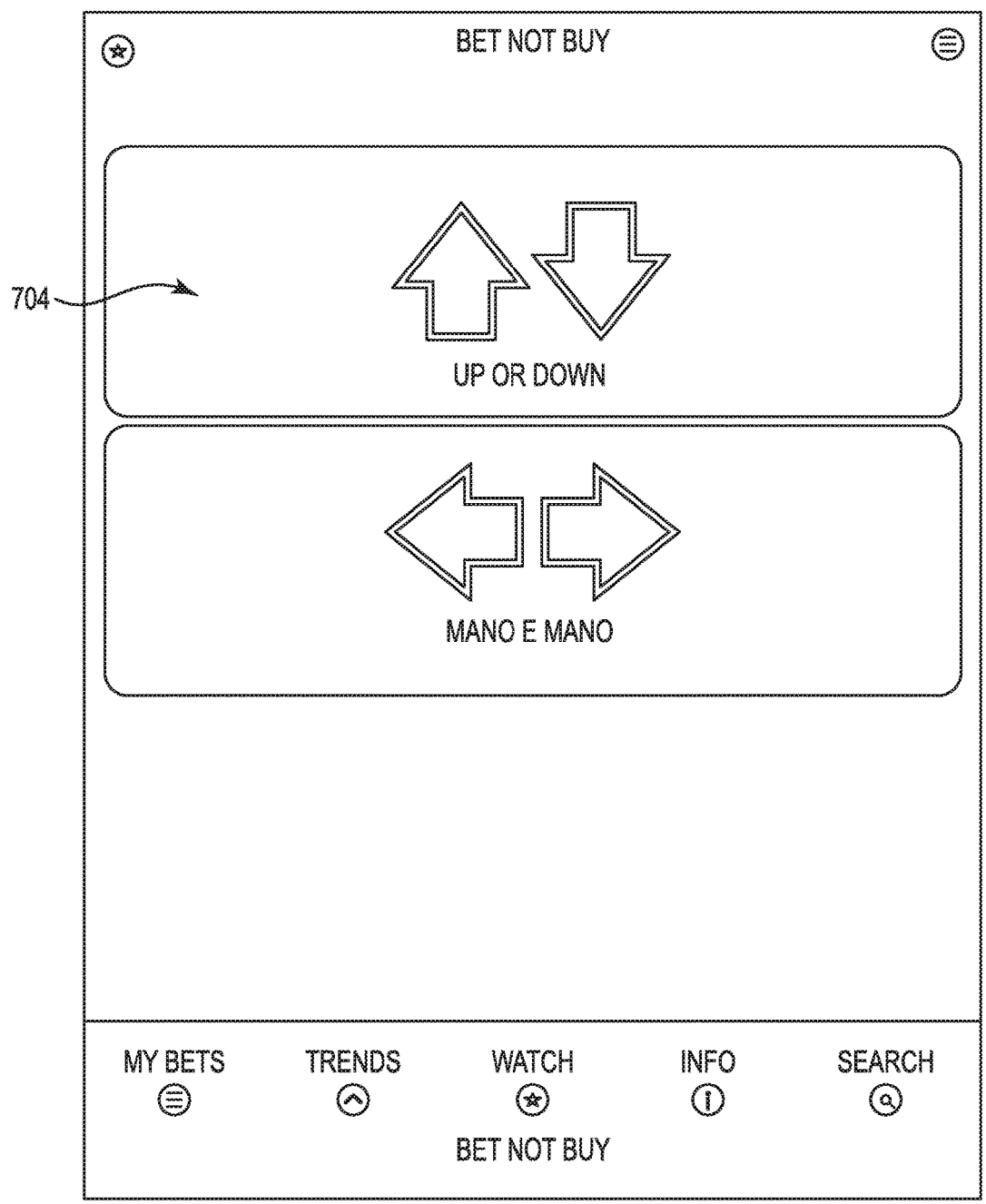
Figure 27:
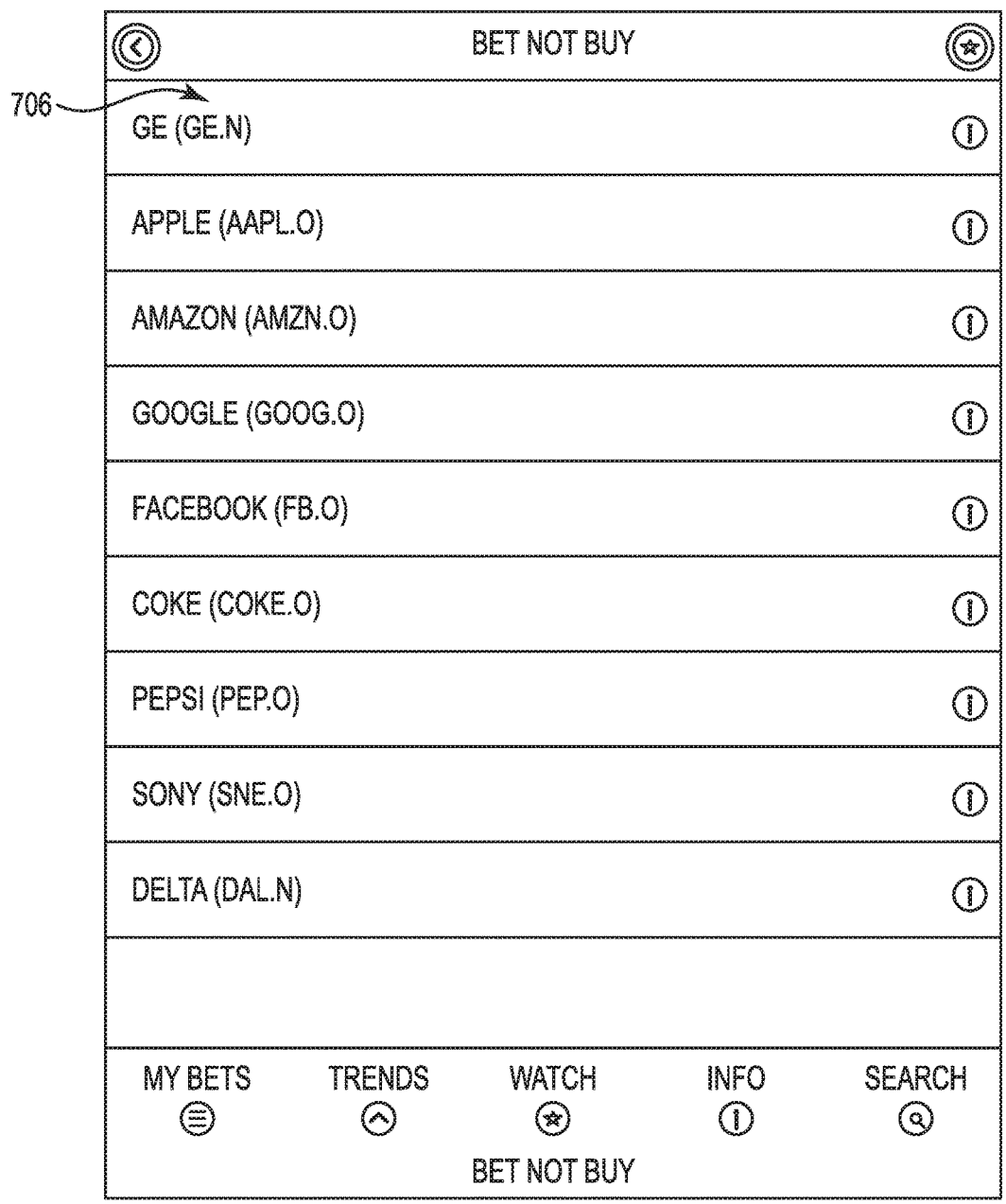

Then, as shown in FIG. 26, the user can select the type of wager 704. Here, the illustrated wager type can be whether a specific stock will go up or down, or whether a selected stock will perform better or worse than another specific stock (mano e mano). Next, in FIG. 27, the user selects their specific "player" 706, which here is the specific stock that is the subject of the up-down challenge.

Figure 28:
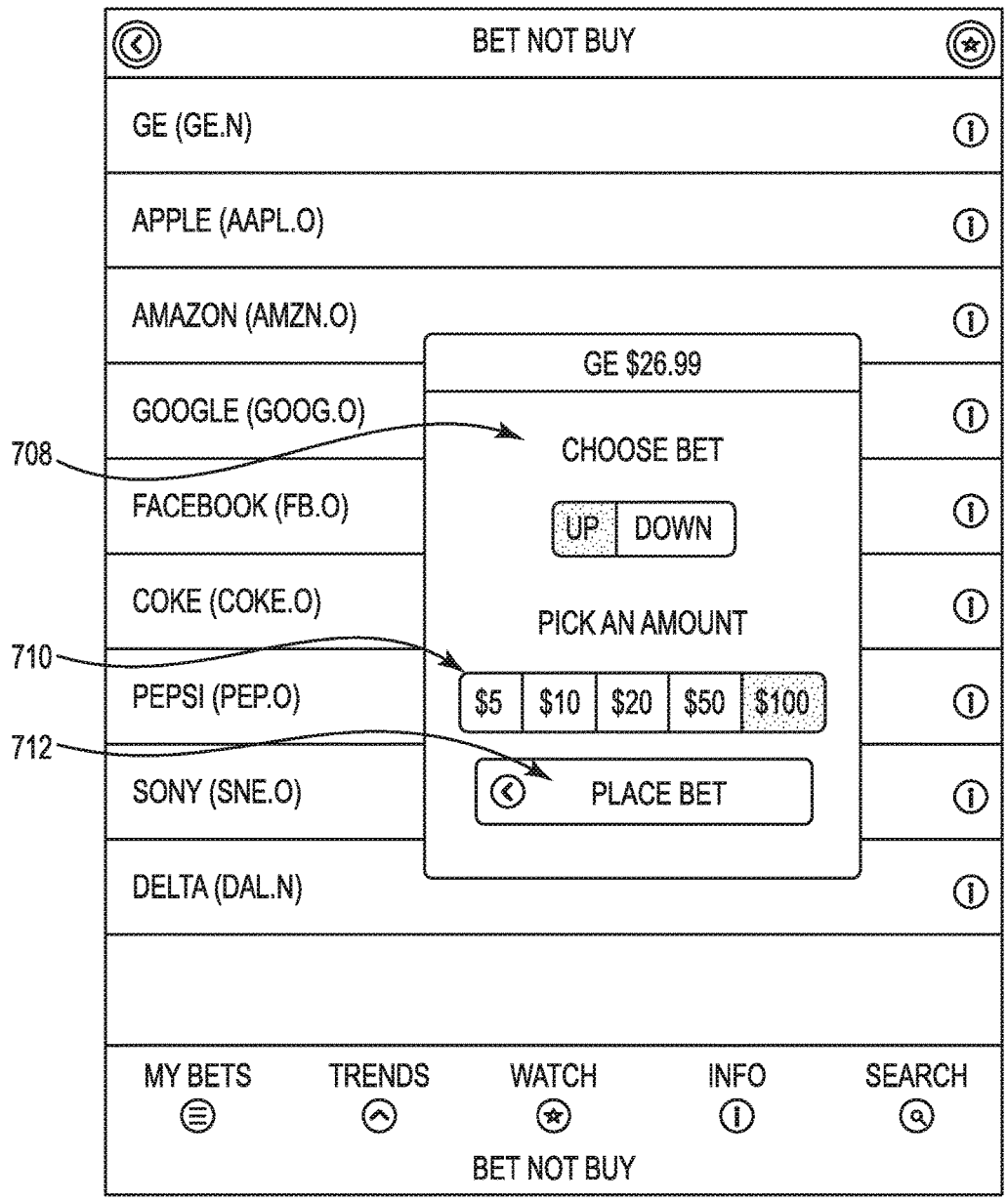

FIG. 28 allows the user to designate if the predicted performance of the specific stock by the end of the time period is to be either up or down 708 from the price of the selected stock identified in the header of the sub-window. The user further can select the amount of the wager that the user wishes to make 710. The user then selects the button "place bet" to confirm their wager and initiate the challenge 712.

FIG. 29 is a ledger screen listing the particular user's history of bet not buy challenges, including the scored outcome and wager amount of each. The currently pending challenge 714 is highlighted while past challenges 716 are not, so that the user can quickly differentiate between the current and past challenges. The user's award "player points" 718 are also indicated on the summary screen.

The left arrow in the header of each screen takes the user to the previous page. The home button will return the user to the home screen.

A mano e mano or head-to-head matchup can also be the subject of a bet not buy challenge. Matchups can be created between athletes, politicians, actors, musicians, etc.—measuring stats and values, not dependent upon whether they actually compete directly with each other. As discussed above, users send head to head challenges to opponents (or the house), such as X will outperform Y in the area of Z (during this timeframe, or in this event). For example, who will have more rushing yards today, Sunday?, Barry Sanders or Marcus Allen? In another example, will Barry Sanders gain more or fewer rushing yards than Marcus Allen in this weekend's slate of pro football games. This same approach can be applied to many different types of subject matters as discussed throughout this specification.

Although several embodiments have been described herein, those of ordinary skill in art, with the benefit of the teachings of this disclosure, will understand and comprehend many other embodiments and modifications for this technology. The invention therefore is not limited to the specific embodiments disclosed or discussed herein, and that may other embodiments and modifications are intended to be included within the scope of the appended claims or inventive concepts. Moreover, although specific terms are occasionally used herein, as well as in the claims or concepts that follow, such terms are used in a generic and descriptive sense only, and should not be construed as limiting the described invention or the claims or concepts that follow.

What is claimed is:

1. A user fantasy challenge gaming system, comprising:
a gaming engine; and
a user computing device coupled to the gaming engine, the user computing device including a graphical user interface, memory and a processor to execute a software application stored in the memory, the software code enabling the user to input a plurality of parameters of a challenge via the graphical user interface, the plurality of challenge parameters selectable by the user via the graphical user interface comprising:
a first screen depicting a plurality of selectable options for a time duration of a challenge;
a second screen depicting a plurality of selectable options for a subject matter of the challenge
a third screen depicting selectable options for a first type of wager for the challenge and a second type of wager for the challenge, the first type of wager being an up or down performance for the subject matter of the challenge and the second type of wager being a head-to-head comparison of two players for the subject matter of the challenge;
a fourth screen depicting a plurality of selectable options for a specific player in the subject matter for the challenge; and
a fifth screen depicting a plurality of selectable options for a wager amount for the challenge,
wherein the gaming engine is configured to receive the plurality of challenge parameters selected by the user, and
wherein the gaming engine includes a matching engine configured to match the user to a target user based upon a comparison of the plurality of challenge parameters selected by the user to a plurality of historical challenge parameters selected by each of a plurality of target users in previous challenges to find a match between at least one of the plurality of challenge parameters and the historical challenge parameters.

2. The system of claim 1, wherein the challenge parameters include the wager amount, the time duration and the subject matter of the challenge.

3. The system of claim 1, wherein the target user is a house user comprising a casino or a sports bookmaker, and wherein the gaming engine accepts or declines the challenge on behalf of the house user.

4. The system of claim 1, wherein the plurality of selectable options for a time duration of a challenge includes two minutes, five minutes and ten minutes.

5. The system of claim 1, wherein the plurality of selectable options for the subject matter of the challenge includes stocks, commodities and sports.

6. The system of claim 1, wherein the specific player is a corporate stock.

7. The system of claim 1, wherein the user computing device is further configured to display via the graphical user interface a ledger screen listing a history the user's challenges, the history including a scored outcome and corresponding wager amount for each listed challenge.

8. The system of claim 1, further comprising the gaming engine configured to award a reward to the user based upon the user's wager amount and a win/loss record of the user.

9. A method of wagering on predicted outcomes of performances in events, the method comprising:
   launching a challenge application on a computing device by a user;
   displaying on a user interface screen a plurality of selectable options for a time duration of a challenge;
   displaying on a user interface screen a plurality of selectable options for a subject matter of the challenge;
   displaying on a user interface screen a plurality of selectable options for a type of wager for the challenge;
   displaying on a user interface screen a plurality of selectable options for a specific competitor for the challenge;
   displaying on a user interface screen a plurality of selectable options for a wager amount for the challenge;
   selecting a plurality of challenge parameters by the user, including:
     the time duration of a challenge;
     the subject matter of the challenge;
     the type of wager for the challenge;
     the specific competitor for the challenge; and
     the wager amount for the challenge;
   transmitting the plurality of challenge parameters to a matching engine; and
   matching by the matching engine the challenge to one or more target users by comparing the plurality of challenge parameters selected by the user to a plurality of historical challenge parameters selected by each of a plurality of target users in previous challenges to find a match between at least one of the plurality of challenge parameters and the historical challenge parameters.

10. The method of claim 9, wherein the method further comprises transmitting the challenge to the one or more target users.

11. The method of claim 9, wherein the comparison of challenge parameters includes the wager amount, the time duration and the subject matter of the challenge.

12. The method of claim 9, further comprising:
   transmitting the challenge parameters by the matching engine to either a sports bookmaker or a casino; and
   deciding by the sports bookmaker or the casino whether to accept or decline the challenge.

13. The method of claim 9, wherein the plurality of selectable options for the time duration of the challenge includes two, five and ten minutes.

14. The method of claim 9, further comprising displaying a ledger screen to the user, the ledger screen listing a history the user's challenges, the history including a scored outcome and corresponding wager amount for each listed challenge.

15. The method of claim 9, further comprising awarding a plurality of points to the user based upon the user's wager amount and a win/loss record of the user.

16. A method of matching a wager of a user on predicted outcomes of performances in events with a target user that is likely to accept the wager of the user, the method comprising:
   presenting the user via a graphical user interface of a computing device a plurality of selectable challenge parameters, including:
     a time duration of a challenge;
     a subject matter of the challenge
     a type of wager for the challenge;
     a specific player for the challenge; and
     a wager amount for the challenge;
   comparing by a matching engine of a gaming engine the plurality of selectable challenge parameters selected by the user to a plurality of historical challenge parameters selected by each of a plurality of target users in previous challenges to find a match between at least one of the plurality of selectable challenge parameters and the historical challenge parameters; and
   transmitting the gaming engine the challenge to the one or more of the plurality of target users where there was a match between the at least one challenge parameters and the historical challenge parameters.

17. The method of claim 16, wherein the selectable challenge parameters for the time duration of the challenge is two, five and ten minutes.

\* \* \* \* \*